(12) United States Patent
Spievak et al.

(10) Patent No.: US 8,687,794 B1
(45) Date of Patent: Apr. 1, 2014

(54) METHODS AND SYSTEMS FOR PROCESSING AND MANAGING TELEPHONIC COMMUNICATIONS

(75) Inventors: Jason S. Spievak, Santa Barbara, CA (US); Robert J. Duva, Santa Barbara, CA (US); Colin D. Kelley, Santa Barbara, CA (US)

(73) Assignee: Invoca, Inc., Santa Barbara, CA (US)

( * ) Notice: Subject to any disclaimer, the term of this patent is extended or adjusted under 35 U.S.C. 154(b) by 1179 days.

(21) Appl. No.: 12/552,905

(22) Filed: Sep. 2, 2009

Related U.S. Application Data

(60) Provisional application No. 61/095,255, filed on Sep. 8, 2008, provisional application No. 61/107,269, filed on Oct. 21, 2008, provisional application No. 61/161,654, filed on Mar. 19, 2009.

(51) Int. Cl.
*H04M 3/00* (2006.01)

(52) U.S. Cl.
USPC ............. 379/266.01; 379/207.02; 379/265.01

(58) Field of Classification Search
USPC .......................... 379/207.02, 265.01–265.14, 379/266.1–266.1
See application file for complete search history.

(56) References Cited

U.S. PATENT DOCUMENTS

| | | | |
|---|---|---|---|
| 5,651,054 A | 7/1997 | Dunn et al. | |
| 5,956,343 A | 9/1999 | Cornes et al. | |
| 6,256,381 B1 | 7/2001 | Donaghue, Jr. | |
| 7,444,148 B1 | 10/2008 | Cook | |
| 7,783,029 B2 | 8/2010 | Whitecotten et al. | |
| 7,792,273 B2 | 9/2010 | Fano et al. | |
| 7,818,195 B2 | 10/2010 | Coon et al. | |
| 7,894,587 B1 | 2/2011 | Laurinavichus | |
| 8,145,212 B2 | 3/2012 | Lopresti et al. | |
| 2002/0110234 A1 | 8/2002 | Walker et al. | |
| 2004/0028213 A1 | 2/2004 | Goss | |
| 2005/0047580 A1 | 3/2005 | Mow et al. | |
| 2005/0152338 A1* | 7/2005 | Chen et al. ..................... 370/352 |
| 2005/0265322 A1 | 12/2005 | Hester | |
| 2006/0184617 A1 | 8/2006 | Nicholas et al. | |
| 2007/0088851 A1* | 4/2007 | Levkovitz et al. ............. 709/246 |
| 2007/0116227 A1* | 5/2007 | Vitenson et al. ......... 379/207.02 |
| 2007/0143182 A1* | 6/2007 | Faber et al. ..................... 705/14 |
| 2007/0211881 A1 | 9/2007 | Parker-Stephen | |
| 2007/0242626 A1* | 10/2007 | Altberg et al. ................ 370/259 |
| 2007/0248220 A1 | 10/2007 | Crandell et al. | |
| 2007/0288312 A1 | 12/2007 | Wang | |
| 2008/0004968 A1 | 1/2008 | Nakao | |
| 2008/0011823 A1 | 1/2008 | Patel et al. | |
| 2008/0037534 A1 | 2/2008 | Shina | |
| 2008/0126476 A1 | 5/2008 | Nicholas et al. | |

(Continued)

*Primary Examiner* — William Deane, Jr.
(74) *Attorney, Agent, or Firm* — Knobbe, Martens, Olson & Bear LLP

(57) ABSTRACT

The present invention relates to online and offline communication processing and tracking using data processing and data/voice networks. A phone address is automatically assigned to a first entity. A call quality rating is determined and recorded. A call from a caller directed to the phone address is received at a call bridging system coupled to at least one network, wherein the call is associated with call signaling information. Based at least in part on the call quality associated with the caller call, the caller call is assigned to a first location in a call queue. An outbound call is generated from the call bridging system and the inbound and the outbound calls are bridged. One or more parameters of the bridged call are compared to the call quality rating. An indication is recorded regarding the successful bridging of the calls in association with a first entity identifier.

69 Claims, 38 Drawing Sheets

(56) References Cited

U.S. PATENT DOCUMENTS

| | | | |
|---|---|---|---|
| 2008/0267388 A1 | 10/2008 | Odinak et al. | |
| 2009/0006199 A1* | 1/2009 | Wang | 705/14 |
| 2009/0046704 A1* | 2/2009 | Sternam | 370/352 |
| 2009/0088219 A1* | 4/2009 | Bayne | 455/566 |
| 2009/0122728 A1* | 5/2009 | Aaltonen et al. | 370/259 |
| 2009/0147778 A1* | 6/2009 | Wanless et al. | 370/389 |
| 2009/0262917 A1 | 10/2009 | Delacey et al. | |
| 2009/0299820 A1 | 12/2009 | Wang et al. | |
| 2010/0002685 A1 | 1/2010 | Shaham et al. | |
| 2010/0002865 A1 | 1/2010 | Kennedy et al. | |
| 2010/0049679 A1 | 2/2010 | Phillips | |
| 2013/0018712 A1* | 1/2013 | Wong et al. | 705/14.4 |

\* cited by examiner

RingRevenue

Track calls like clicks.

Home | Campaigns | Reports | Account | Help | Logout

Notifications

- Welcome to the pay-per-call beta trial! — Oct 20
- You have 1 advertiser campaign expiring within 30 days — Oct 20
- You have 1 affiliate campaign application approval

Quick Stats

| Call Quality | # Calls | % Calls | Cost |
|---|---|---|---|
| High | 26 | 36% | $130.00 |
| Medium | 32 | 44% | $96.00 |
| Low | 14 | 19% | $14.00 |
| No Payout | 0 | 0% | $0.00 |
| Total | 72 | 100% | $240.00 |

Recent Calls

| Affiliate | Campaign | Media Type | Commission | Quality | City | State | Caller ID | Duration | Date/Time |
|---|---|---|---|---|---|---|---|---|---|
| Where2Getit | Outback Steakhouse Gift Cards | Internet | $1.00 | Low | Danbury | CT | 209-240-16** | 0:32 | 10/15/2008 - 05:46:51 |
| Where2Getit | Outback Steakhouse Gift Cards | Internet | $3.00 | Medium | Chicago | IL | 773-508-40** | 0:17 | 10/09/2008 - 05:59:57 |
| Where2Getit | Outback Steakhouse Santa Barbara | Internet | $3.00 | Medium | | | 883-063-40** | 0:10 | 09/16/2008 - 04:03:14 |
| Where2Getit | Outback Steakhouse Santa Barbara | Internet | $3.00 | Medium | Santa Barbara | CA | 805-680-12** | 8:20 | 09/16/2008 - 03:24:09 |
| Where2Getit | Outback Steakhouse Santa Barbara | Internet | $1.00 | Low | | | 241-879-22** | 0:10 | 09/16/2008 - 02:25:37 |
| Where2Getit | Outback Steakhouse Santa Barbara | Internet | $1.00 | Low | Merion Station | PA | 610-667-42** | 10:00 | 09/16/2008 - 03:30:13 |
| Where2Getit | Outback Steakhouse Santa Barbara | Internet | $1.00 | Low | Santa Barbara | CA | 805-680-12** | 8:20 | 09/15/2008 - 09:21:36 |
| Where2Getit | Outback Steakhouse | Internet | $1.00 | Low | Santa | CA | 805-680-12** | 8:20 | 09/15/2008 - 09:21:36 |

RingRevenue — Track calls like clicks. | Home | Campaigns | Reports | Account | Help | Logout

Edit Campaign

Step
- >> 1. Overview
- >> 2. Call Pricing
- >> 3. Target Regions
- >> 4. Call Treatment
- >> 5. Hours
- >> 6. Target Profile
- >> 7. Keywords
- >> 8. Creatives Step 6: Target Profile — *161*

☐ Show All Fields

☐ Gender
☐ Age
☐ Household income
☐ Marital status
☐ Education
☐ Ethnicity
☐ Calling from

*162*

[Next] [Done]

*FIG. 17*

RingRevenue | Track calls like clicks. | Home | Campaigns | Reports | Account | Help | Logout

Edit Campaign

Step
>> 1. Overview
>> 2. Call Pricing
>> 3. Target Regions
>> 4. Call Treatment
>> 5. Hours
>> 6. Target Profile
>> 7. Keywords
>> 8. Creatives

Step 6: Target Profile

☑ Show All Fields

☐ Gender
|  | None | Low | Medium | High |
Male
Female

☐ Age
|  | None | Low | Medium | High |
18-24
25-34
35-44
45-54
55-64
65+

☐ Household income
|  | None | Low | Medium | High |
$0 - 30K
$30 - 60K
$60 - 100K
$100K+

☐ Marital status
|  | None | Low | Medium | High |
Married
Single

☐ Education
|  | None | Low | Medium | High |
No College
College
Gradudate School ☐ Ethnicity
|  | None | Low | Medium | High |
Caucasian
African American
Asian
Hispanic
Other ☐ Calling from
|  | None | Low | Medium | High |
Mobile
Landline - Home
Landline - Buisness

[Next] [Done]

*FIG. 18*

RingRevenue - Track Calls Like Clicks

Campaigns | Reports | Account | Logout

Notifications

Welcome to the pay-per-call beta trial!
You have 1 campaign expiring within 30 days.

Quick Stats

| Call Quality | # Calls | % Calls | Earnings |
|---|---|---|---|
| High | 0 | - | $0.00 |
| Medium | 0 | - | $0.00 |
| Low | 0 | - | $0.00 |
| No Payout | 0 | - | $0.00 |
| Total | 0 | - | $0.00 |

Rob D's Campaigns

| Status | Campaign | Category | Total Calls | Earnings | Manage Campaigns |
|---|---|---|---|---|---|
| Active | BabyFans - Direct Mail | Family> Babies | 2 | $6.00 | Numbers \| Creative Reports |
| Active | BabyFans - SAS Card | Family> Babies | 54 | $345.50 | Numbers \| Creative Reports |
| Active | Intuit Accountant | Buisness> productivity Tools | 1 | $10.00 | Numbers \| Creative Reports |
| Active | QuickBooks Point Of Sale | Buisness> productivity Tools | 1 | $25.00 | Numbers \| Creative Reports |
| Active | Top Cash Flows | Financial Services> Real Estate Service | 9 | $68.00 | Numbers \| Creative Reports |
| Active | WineSmith | Food & Drinks> Wine & Spirits | 2 | $10.00 | Numbers \| Creative Reports |

Apply to New Campaigns

| Advertiser | Campaign | Category | Call Price | Avg. EPC | Apply |
|---|---|---|---|---|---|
| Baby Fans | Test | Family> Babies | $10.00 | - | Apply |
| University of Phoenix | University of Phoenix | Education> College | $100.00, 50.00, 10.00 | - | Apply |
| Scott Herriman Ad Pro | Save - Infastructure Test | Computer & Electronics> Computer Sup... | $0.00, 0.00, 0.00 | - | Apply |
| Outback Steakhouse | Outback Steakhouse - LA | Food & Drinks> Restaurants | $2.00, 1.00, 0.50 | $3.38 | Apply |
| Outback Steakhouse | Outback Steakhouse - SB | Food & Drinks> Restaurants | $5.00, 3.00, 1.00 | $3.00 | Apply |
| Outback Steakhouse | Outback Steakhouse Gift Cards | Food & Drinks> Restaurants | $5.00, 3.00, 1.00 | $0.26 | Apply |
| Scott Herriman Ad Pro | Production Test 866-683-1041 | Computer & Electronics> Computer Sup... | $2.00, 1.00, 1.00 | $20.00 | Apply |
| Merrill Lynch | RingRevenue - Affiliate Summit | Telecommunications> Online/Wireless | $50.00, 20.00, 5.00 | $45.45 | Apply |
| Merrill Lynch | Merrill Lynch | Financial Services> Investment | $100.00, 50.00, 20.00 | | Apply |

FIG. 21

RingRevenue | Track calls like clicks. | Campaigns | Reports | Account | Help | Logout

University of Phoenix: Univerity of Phoenix

Campaign Overview

| | |
|---|---|
| Category: | Education> College |
| Start Date: | 09/30/2008 |
| Expiration Date: | Ongoing |
| Description: | Looking for campus or online university-level programs that are convenient yet high quality? University of Phoenix provides nearby campus locations, online degree programs and flexible scheduling for working students. Our campus and online degree programs cover fields such as business and management, communications, criminal justice and security, education, general studies, nursing and health care, human services, psychology, and technology. Whether you attend class on campus or online, University of Phoenix enables you to earn your college degree without putting your life on hold. |

Call Quality & Targeting Criteria

Call quality is determined by a proprietary algorithm that evaluates calls based on targeting criteria (geography and other demographics) and call characteristics (length of call, actions by callers, etc). Below are some of the quality attributes for this campaign:

| | |
|---|---|
| Time of Call: | 24/7 Operation |
| Target Regions: | All US |
| Target Caller Profile: | Gender<br>Male - None<br>Female - None<br>Age<br>18-24 - None<br>25-34 - None<br>35-44 - None |

Campaign Pricing

Dynamic Quality Pricing Per Call (H, M, L):   $100.00, 50.00, 10.00

Campaign Creative

No Creative Available

Application and Agreement to Terms

By applying to this campaign you agree to be compensated according to the pay-per-call pricing outlined for this campaign and to make reasonable efforts to target promotions based on the call quality targeting criteria specified.

☐ I have read the terms and agree to operate within them.
[Apply]

RingRevenue

Track calls like clicks.

Welcome RingRevenue!

Network Status

| Advertisers | Affiliates | Campaigns | Today's Calls | Yesterday's Calls | Month-toDate Calls | Month-toDate Commissions |
|---|---|---|---|---|---|---|
| 8 | 6 | 15 | 0 | 0 | 30 | $154.00 |

Advertisers  (New advertiser)  (Campaign Visibility)—56

| Advertisers | Affiliates | Today's Calls | Yesterday's Calls | Month-toDate Calls | Month-toDate Commissions |
|---|---|---|---|---|---|
| Baby Fans | 2 | 0 | 0 | 6 | 48.0 |
| Intuit | 2 | 0 | 0 | 2 | 35.0 |
| Merrill Lynch | 1 | 0 | 0 | 1 | 50.0 |
| Outback Steakhouse | 1 | 0 | 0 | 18 | 3.0 |
| Scott Herman Ad Pro | 1 | 0 | 0 | 1 | 4.0 |
| Top Cash Flows | 0 | 0 | 0 | 0 | 12.0 |
| University of Phoenix | 0 | 0 | 0 | 0 | 0.0 |
| WineSmith | 1 | 0 | 0 | 1 | 2.0 |

Affiliates  (New affiliates)

| Affiliates | Campaigns | Today's Calls | Yesterday's Calls | Month-toDate Calls | Month-toDate Commissions |
|---|---|---|---|---|---|
| Rob D | 6 | 0 | 0 | 10 | 97.0 |
| Rob Duva Test | 2 | 0 | 0 | 1 | 50.0 |
| Scott Herman | 2 | 0 | 0 | 18 | 4.0 |
| Test Affiliate | 2 | 0 | 0 | 0 | 0.0 |
| Todd Wilson | 3 | 0 | 0 | 0 | 0.0 |
| Where2Getit | 2 | 0 | 0 | 1 | 3.0 |

FIG. 28

RingRevenue — Track calls like clicks. | Account | Help | Logout

Advertiser Campaign Visibility

| Advertiser | Campaign | Visible to | |
|---|---|---|---|
| Baby Fans | BabyFans - Direct Mail | ☐ | 2 affiliates |
| Baby Fans | BabyFans - Email | ☐ | 0 affiliates |
| Baby Fans | BabyFans - SAS Card | ☐ | 4 affiliates |
| Baby Fans | Test | ☑ | all affiliates |
| H&H | H&H Test! | ☑ | all affiliates |
| Intuit | Intuit Accountant | ☑ | all affiliates |
| Intuit | QuickBooks Point Of Sale | ☑ | all affiliates |
| Intuit | Quicken 2009 | ☑ | all affiliates |
| Merrill Lynch | Merrill Lynch | ☑ | all affiliates |
| Merrill Lynch | RingRevenue - Affiliate Summit | ☑ | all affiliates |
| Outback Steakhouse | Outback Steakhouse - Santa Barbara | ☑ | all affiliates |
| Outback Steakhouse | Outback Steakhouse - LA | ☑ | all affiliates |
| Outback Steakhouse | Outback Steakhouse Gift Cards | ☑ | all affiliates |
| Outback Steakhouse | Save your 401K | ☑ | all affiliates |
| Scott Herriman Ad Pro | Production Test 866-683-1041 | ☑ | all affiliates |
| Scott Herriman Ad Pro | Save - Infastructure Test 866-683-1043 | ☑ | all affiliates |
| Top Cash Flows | Top Cash Flows | ☑ | all affiliates |
| University of Phoenix | University of Phoenix | ☑ | all affiliates |
| WineSmith | WineSmith | ☑ | all affiliates |

[Done]

FIG. 29

| Baby Fans: BabyFans - SAS Card | | |
|---|---|---|
| Affiliate | Campaign Visible | Hidden |
| Paul R | ○ | ◉ |
| Rob D | ○ | ◉ |
| Rob Duva Test | ○ | ◉ |
| Scott Herriman | ◉ | ○ |
| Test Affiliate | ◉ | ○ |
| Todd Wilson | ○ | ◉ |
| WeCanSellAnyting | ◉ | ○ |
| Where2GetIt | ◉ | ○ |

FIG. 30

RingRevenue
Track calls like clicks.

Account | Help | Logout

Advertiser Campaign Visibility

| Advertiser | Campaign | Visible to |
|---|---|---|
| Baby Fans | BabyFans - Direct Mail | ☐ 2 affiliates |
| Baby Fans | BabyFans - Email | ☐ 0 affiliates |
| Baby Fans | BabyFans - SAS Card | ☐ 4 affiliates |
| Baby Fans | Test | ☑ 2 affiliates |

[Done]

*FIG. 31*

METHODS AND SYSTEMS FOR PROCESSING AND MANAGING TELEPHONIC COMMUNICATIONS

CROSS REFERENCE TO RELATED APPLICATIONS

This application claims the benefit under 35 U.S.C. 119(e) of U.S. Provisional Application No. 61/095,255 filed Sep. 8, 2008, U.S. Provisional Application No. 61/107,269, filed Oct. 21, 2008, and U.S. Provisional Application No. 61/161,654, filed Mar. 19, 2009, the contents of which are incorporated herein in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF THE INVENTION

The present invention relates to systems and methods for communication tracking and processing, and in particular, to methods and systems for tracking and processing phone communications, emails and/or other correspondence information.

BACKGROUND

Certain conventional systems provide for on-line initiated calls, sometimes referred to as "click-to-call". Click-to-call provides users accessing a web page including an advertisement with a dialogue box which requests the user's phone number and occasionally other information such as name and an affiliate code the user is requested to transcribe from the website. When provided, the number is transmitted to the advertiser along with the affiliate's contact information for commission purposes. The advertiser calls the user back, and any sale is consummated over the telephone.

The foregoing conventional solution has not been well received by the online advertising community for several reasons. First, it is counter-intuitive for users to send their phone number to the advertiser, when it is the user who wants to call the advertiser. When a user wants to call an advertiser, he or she generally wants to pick up his or her phone and actually call the advertiser. He or she doesn't want to send the advertiser his or her number and wait for a call back. Users are also wary of sending their telephone number to an advertiser using these types of dialogue boxes because of online fraud. Also, by the time the call is returned, the user might have lost interest in buying the product, or had already purchased the item elsewhere. When alternative advertising models are considered (such as television and newspaper which represent the vast majority of advertising dollars spent), the click-to-call functionality cannot be used. As a result of these deficiencies, the click-to-call mechanism has limited utility.

SUMMARY OF INVENTION

Methods and systems are described for facilitating communication-related tracking and processing.

A given embodiment may include some or all of the features, functionality, systems and methods described herein.

An example embodiment provides a method of processing calls, comprising: automatically assigning a phone address to a first entity; recording in computer readable memory call quality rating criteria; receiving at a call bridging system coupled to at least one network, a call from a caller directed to the phone address wherein the call is associated with call signaling information; based at least in part on one or more call quality indicators associated with the caller call, assigning the caller call to a first location in a call queue; generating an outbound call from the call bridging system; bridging the inbound and the outbound call; comparing parameters of the caller call and/or the bridged call to the call quality rating criteria; and recording an indication of the successful bridging of the calls in association with a first entity identifier.

An example embodiment provides a method of processing calls, comprising: assigning a phone address to an advertising campaign in response to a request received over a data network; storing in computer memory call quality rating criteria; receiving at a call bridging system coupled to at least one network, a call from a caller directed to the phone address wherein the call is associated with call signaling information; generating an outbound call from the call bridging system; bridging the inbound and the outbound call; comparing one or more parameters of the received call and/or the bridged call to the call quality rating criteria; and crediting the affiliate for the bridged call based at least in part on the comparison of the one or more parameters with the call quality rating criteria.

An example embodiment provides a method of processing call information, comprising: storing in computer readable memory call quality rating criteria; receiving at a call bridging system coupled to at least one network, a request over a data network from a user to receive a call; generating at the call bridging system a first outbound call to the user; generating a second outbound call from the call bridging system; bridging the first and second outbound calls; comparing one or more parameters of the received call and/or the bridged call to the call quality rating criteria; and crediting an affiliate for the bridged call based at least in part on the comparison of the one or more parameters with the call quality rating criteria.

An example embodiment provides a method of phone communications, comprising: creating an information object in a server system; storing the information object in computer readable memory; assigning a phone address to the information object; making available the information object from an affiliate server to an advertiser server over a data network in response to a user gesture with respect to a web page; enabling the display of the phone address to the user on an advertiser's web page; receiving at a call bridging system coupled to at least one network, a call from the user directed to the phone address, wherein the call is associated with call signaling information; generating an outbound call from the call bridging system to a number specified by the advertiser;

bridging the inbound and the outbound call; and crediting the affiliate with respect to the bridged call.

An example embodiment provides a method of processing telecommunications comprising: assigning a phone address for use with an advertising campaign; receiving at a call bridging system coupled to at least one network, a call from a caller directed to the phone address; generating an outbound call from the call bridging system to a number specified in an advertising campaign; bridging the inbound and the outbound call to form a bridged call; monitoring one or more call parameters; comparing one or more call parameters against a set of threshold values that includes at least one threshold value; rejecting at least one subsequent call to the phone address based on the comparison exceeding a first threshold value; and crediting an affiliate for non-rejected bridged calls and inhibiting crediting the affiliate for rejected calls.

An example embodiment provides a method of tracking and crediting call related information, comprising: assigning a phone address for use with an advertising campaign; storing in a tangible computer readable medium call quality rating criteria; receiving at a call bridging system coupled to at least one network, a call from a caller directed to the phone address; based at least in part on the phone address called, play a selected voice prompt to the caller; generating an outbound call from the call bridging system based at least in part on a caller's response to one or more voice prompts and a phone address specified by the advertiser; bridging the inbound and the outbound call; comparing one or more parameters of the caller cal and/or the bridged call to the call quality rating criteria; and crediting an affiliate for the bridged call based at least in part of the comparison.

An example embodiment provides a tangible computer-readable medium having computer-executable instructions stored thereon that, if executed by a computing device, cause the computing device to perform a method comprising: assigning a phone address to an advertising campaign in response to a request received over a data network; storing in computer memory call quality rating criteria; receiving a call from a caller directed to the phone address wherein the call is associated with call signaling information; initiating an outbound call; causing the inbound and the outbound call to be connected; comparing one or more parameters of the received call and/or the connected call to the call quality rating criteria; and crediting an affiliate for the connected call based at least in part on the comparison of the one or more parameters with the call quality rating criteria. Certain embodiments provide systems and methods for routing calls to promotional phone numbers (such as promotional phone numbers, which may be any form of phone address including numbers and/or other characters) to destination phone numbers, such as those associated with an advertiser. Optionally, promotional phone numbers may be dynamically generated and rapidly provisioned to affiliates of the advertisers.

Certain embodiments provide systems and methods for routing, such as routing communications associated with certain email addresses (e.g., promotional email addresses), URLs (e.g., promotional URLs), and other contact information to destination email addresses, URL'S and contact information. Certain embodiments providing systems and methods for sending SMS messages to a customer, affiliate, or advertiser are presented.

In certain example embodiments, an intuitive and user friendly interface is optionally provided that enables users to quickly and easily enter into and monitor advertising campaigns and transactions.

In certain example embodiments, a marketing and/or sales campaign is used. In a campaign, a provider of a product or service employs a collection of online and/or offline advertising practices to promote their product or service. Optionally the campaign can have a fixed or variable budget, a specified sales period (e.g., 6 months), and a target customer. Other campaign attributes are described below.

In certain example embodiments, campaign creation systems and methods are provided which enable users, such as advertisers or their agents, to generate new advertising campaigns, and enable other users, such as affiliates, to view and apply to these campaigns. In certain example embodiments, systems and methods are provided for approving campaigns. An affiliate may be an entity that is rewarded by an advertiser for a visitor or customer brought about by the affiliate's marketing efforts. For example, an affiliate may have a Website that promotes the services or products of another party. As discussed elsewhere herein, the affiliate Website may include an advertisement for another business (the advertiser), including a user interface for initiating a call or other communication with the advertiser.

In certain example embodiments, advertisers and/or third party agents of advertisers assign phone numbers for direct media placements that don't include affiliates and don't trigger commissions. Optionally, advertisers and/or third party agents track affiliate and non-affiliate campaigns using a single user interface and/or account.

In certain example embodiments, advertisers and/or third party agents of advertisers generate more than one advertising campaigns. Optionally, multiple campaigns and/or accounts can be joined or linked to simplify account access and administration (e.g., master account login with toggle access to other accounts).

In certain example embodiments, advertisers and/or third party agents of advertisers provide (e.g., upload) a collection of call records (e.g., a list of phone numbers) evaluated by the system using a collection of databases to determine expected costs of an advertising campaigns, recommended affiliate pricing of advertising campaigns, criteria to be used in establishing call quality, which advertising campaigns to target to which set of customers/users, which offer to provide which set of customers/users, media placement, etc.

In certain example embodiments, advertisers and/or third party agents of advertisers provide (e.g., upload) a collection of advertiser phone addresses (e.g., local or toll-free phone addresses) evaluated by the system using a collection of databases to determine which phone addresses will perform optimally in which campaigns. For example, a vanity toll-free number may out perform a local number (e.g., presents a larger corporate image) on a given offer. In another example, the system evaluates different toll-free vanity numbers on a given offer.

In certain example embodiments, a call price calculator and methods are provided that can be utilized to calculate and suggest call pricing values for users, such as advertisers. In certain example embodiments, systems and methods are provided for determining call quality. Call quality relates to whether a potential customer is likely to purchase goods or services from the advertiser. Thus, determining call quality may include determining the likelihood that a potential customer will purchase goods or services from the advertiser.

Certain embodiments provide systems and methods for creating interactive voice systems that sit in front of the call before transferring to the advertiser's call center. Certain embodiments provide systems and methods for using call quality to selectively direct calls to certain phone addresses or messages to terminals or to affect the place of a call in a phone queue. Certain embodiments provide systems and methods for setting which campaigns particular affiliates can view.

Certain embodiments provide systems and methods for generating dynamic software code so that websites, text messages and other such displays (e.g., promotional communications) can dynamically display a promotional phone number, email, URL, and/or other contact information. Optionally, the phone number, email, URL, and/or other contact information may be different from the corresponding contact information which is considered the default for such websites, text messages, or other promotional displays.

Certain embodiments provide systems and methods for validating that an affiliate is registered with the affiliate network's website. This optionally enables an advertiser to prevent an affiliate from promoting a campaign that the advertiser does not want promoted. Certain embodiments provide systems and methods for enabling a user, such as an advertiser, to set the time or duration the affiliate promotional contact information may be used. Certain embodiments provide systems and methods for the advertiser or the affiliate to use click-to-call functionality in their websites. Certain embodiments provide systems and methods for enabling an advertiser to promote their own brand or website without an affiliate through the issuance of promotional phone numbers or other contact information by issuing the advertiser their own promotional contact information. Certain embodiments provide systems and methods for generating advertising creatives which may include the integration of promotional contact information. Optionally, the promotional contact information may be placed in the meta data of the creative, edited into the image of the creative directly, or attached to the top, bottom or side of the creative as a sidebar, hover, or slide-out.

One embodiment is a method of tracking and crediting promotional leads comprising: receiving at a call bridging system, a call from a caller directed to a phone address; generating an outbound call from the call bridging system; bridging the inbound and the outbound call; and sometimes comparing parameters of the bridged call to a call quality rating.

Another embodiment is a method of tracking and crediting promotional leads comprising: assigning a phone address; establishing a call quality rating for calls; receiving at a call bridging system coupled to at least one network, a call from a caller directed to the phone address wherein the call is associated with call signaling information; generating an outbound call from the call bridging system; bridging the inbound and the outbound call; sometimes comparing parameters of the bridged call to the call quality rating; and crediting an affiliate for the bridged call. Optionally, wherein the phone address is a toll-free phone number. Optionally, wherein the network comprises a public switched telephone network for both wireless and wireline communications and public and private data networks. Optionally, the method further comprising: recording at least a portion of the call audio; and making at least a portion of the recording available to an affiliate network or advertiser. Optionally, the method further comprising: recognizing words and/or phrases in the caller voice communication; comparing words and/or phrases from the first voice communication to a set of keywords and/or phrases; and if there is a match, storing in computer memory the detection of a keyword and/or phrase. Optionally, the method further comprising: comparing the calling party phone address in the call signaling information with the calling party phone address of previous calls in a configurable time period; and if there is a match, crediting the affiliate a default amount or an amount specified by the advertiser. Optionally, wherein the amount credited to an affiliate on a match is no credit amount.

Another embodiment is a method of tracking and crediting promotional leads in an affiliate network comprising: receiving at a call bridging system, a request from a user to receive a call; generating at the call bridging system a first outbound call to the user; generating a second outbound call from the call bridging system; bridging the first and second outbound calls; and sometimes comparing parameters of the bridged call to a call quality rating.

Another embodiment is a method of tracking and crediting promotional leads in an affiliate network comprising: establishing a call quality rating; receiving at a call bridging system coupled to at least one network, a request from a user to receive a call; generating at the call bridging system a first outbound call to the user; generating a second outbound call from the call bridging system; bridging the first and second outbound calls; comparing parameters of the bridged call to the call quality rating; and crediting an affiliate for the bridged call. Optionally, wherein the request from the user to receive a call is in response to the selection of a web page control. Optionally, wherein the network comprises a public switched telephone network for both wireless and wireline communications and public and private data networks. Optionally, the method further comprising: recording at least a portion of the call audio; and making at least a portion of the recording available to an affiliate network or advertiser. Optionally, the method further comprising: recognizing words and/or phrases in the caller voice communication; comparing words and/or phrases from the first voice communication to a set of keywords and/or phrases; and if there is a match, storing in computer memory the detection of a keyword and/or phrase. Optionally, the method further comprising: comparing the user's phone address with the calling party phone address of previous calls in a configurable time period; and if there is a match, crediting the affiliate a default amount or an amount specified by the advertiser. Optionally, wherein the amount credited to an affiliate on a match is no credit amount.

Another embodiment is a method of managing promotional leads comprising: creating an information object; assigning a phone address to the information object; exchanging the information object from an affiliate to an advertiser in response to a user gesture on a web page; and displaying the phone address to the user on an advertiser's web page.

Another embodiment is a method of managing promotional leads comprising: creating an information object in a server system; storing the information object in computer readable memory; assigning a phone address to the information object; exchanging the information object from an affiliate server to an advertiser server over a data network in response to a user gesture on a web page; and displaying the phone address to the user on an advertiser's web page. Optionally, the method further comprising: receiving at a call bridging system coupled to at least one network, a call from the user directed to the phone address, wherein the call is associated with call signaling information; generating an outbound call from the call bridging system to a number specified by the advertiser; bridging the inbound and the outbound call; and crediting the affiliate for the bridged call. Optionally, wherein the information object is an affiliate information object. Optionally, wherein the information object is web-based. Optionally, the method further comprising: receiving at a call bridging system coupled to a data and voice network, a request from the user to receive a call; generating at the call bridging system a first outbound call to the user; generating a second outbound call from the call bridging system to a number specified by the advertiser; bridging the first and second outbound calls; and crediting an affiliate for the bridged call.

Another embodiment is a method of monitoring promotional leads for fraud comprising: assigning a phone address; receiving at a call bridging system, a call from a caller directed to the phone address; generating an outbound call from the call bridging system; bridging the inbound and the outbound call to form a bridged call; monitoring call parameters; comparing one or more call parameters against a set of threshold values; and rejecting at least one subsequent call to the phone address based on the comparison exceeding a threshold value.

Another embodiment is a method of monitoring promotional leads for fraud comprising: assigning a phone address; receiving at a call bridging system coupled to at least one network, a call from a caller directed to the phone address; generating an outbound call from the call bridging system to a number specified in an advertising campaign; bridging the inbound and the outbound call to form a bridged call; monitoring call parameters; comparing one or more call parameters against a set of threshold values; rejecting at least one subsequent call to the phone address based on the comparison exceeding a threshold value; and crediting an affiliate for non-rejected bridged calls. Optionally, wherein a call parameter is the length of the call. Optionally, wherein a caller hears ring no answer, busy, or a recorded announcement if the call is rejected.

Another embodiment is a method of tracking and crediting promotional leads comprising: assigning a phone address; receiving at a call bridging system, a call from a caller directed to the phone address; play a voice prompt to the caller; generating an outbound call from the call bridging system based at least in part on the caller's response to one or more voice prompts and a phone address specified by the advertiser; and bridging the inbound and the outbound call.

Another embodiment is a method of tracking and crediting promotional leads comprising: assigning a phone address; establishing a call quality rating; receiving at a call bridging system coupled to at least one network, a call from a caller directed to the phone address; based at least in part on the phone address called, the calling party phone address, or other conditions as determined at least in part from these phone addresses; play a voice prompt to the caller; generating an outbound call from the call bridging system based at least in part on the caller's response to one or more voice prompts and a phone address specified by the advertiser; bridging the inbound and the outbound call; and crediting an affiliate for the bridged call. Optionally, wherein the caller's response is a generated dual-tone multi-frequency tone. Optionally, wherein the caller's response is a spoken command.

BRIEF DESCRIPTION OF THE FIGURES

FIG. 4: is an illustration of an example embodiment of the home screen of an advertiser.

Figure 5:
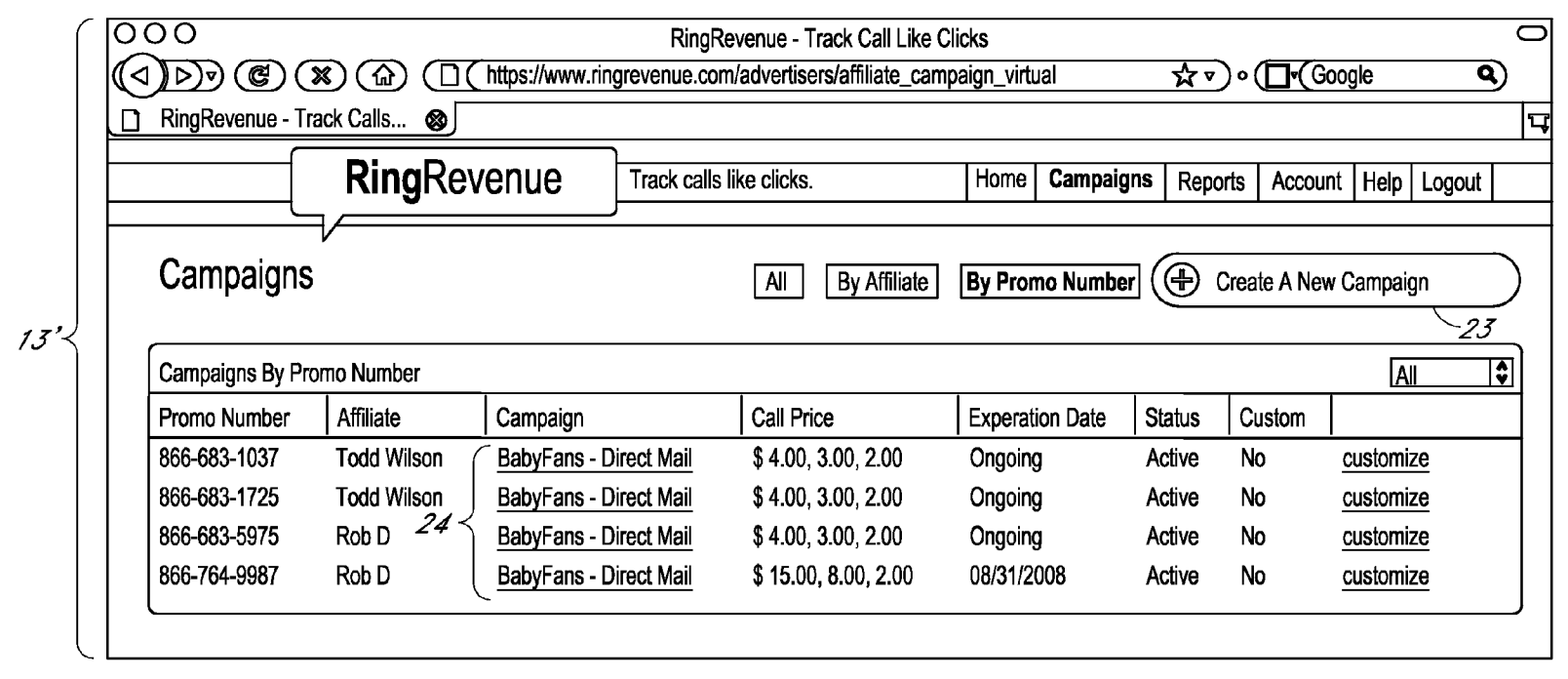

FIG. 5: is an illustration of an example embodiment for viewing various campaigns and campaign information.

FIG. 8: is an illustration of an example embodiment for viewing or modifying account settings.

FIG. 12: is an illustration of an example embodiment for creating a new campaign which illustrates a call price calculator.

FIG. 14: is an illustration of an example embodiment for creating a new campaign which illustrates the call treatment submodule utilizing the single destination routine.

FIG. 16: is an illustration of an example embodiment for creating a new campaign which illustrates the hours of operation submodule.

FIG. 17: is an illustration of an example embodiment for creating a new campaign which illustrates the target profile submodule in a collapsed view.

FIG. 18: is an illustration of an example embodiment for creating a new campaign which illustrates the hours of operation submodule in an expanded view.

FIG. 21: is an illustration of an example embodiment of the home screen of an affiliate.

FIG. 22: is an illustration of an example embodiment which illustrates the campaign viewing module.

FIG. 23: is an illustration of an example embodiment which illustrates the campaign acceptance module.

FIG. 24: is an illustration of an example embodiment which illustrates the number selection submodule.

FIG. 28: is an illustration of an example embodiment of the home screen of the affiliate network.

FIG. 29: is an illustration of an example embodiment which illustrates the campaign visibility module of the affiliate network.

FIG. 30: is an illustration of an example embodiment which illustrates the change affiliates submodule.

FIG. 31: is an illustration of an example embodiment which illustrates the campaign visibility module of the affiliate.

DETAILED DESCRIPTION OF PREFERRED EMBODIMENTS

Methods and systems are described for facilitating communication-related tracking and processing.

Figure 1:
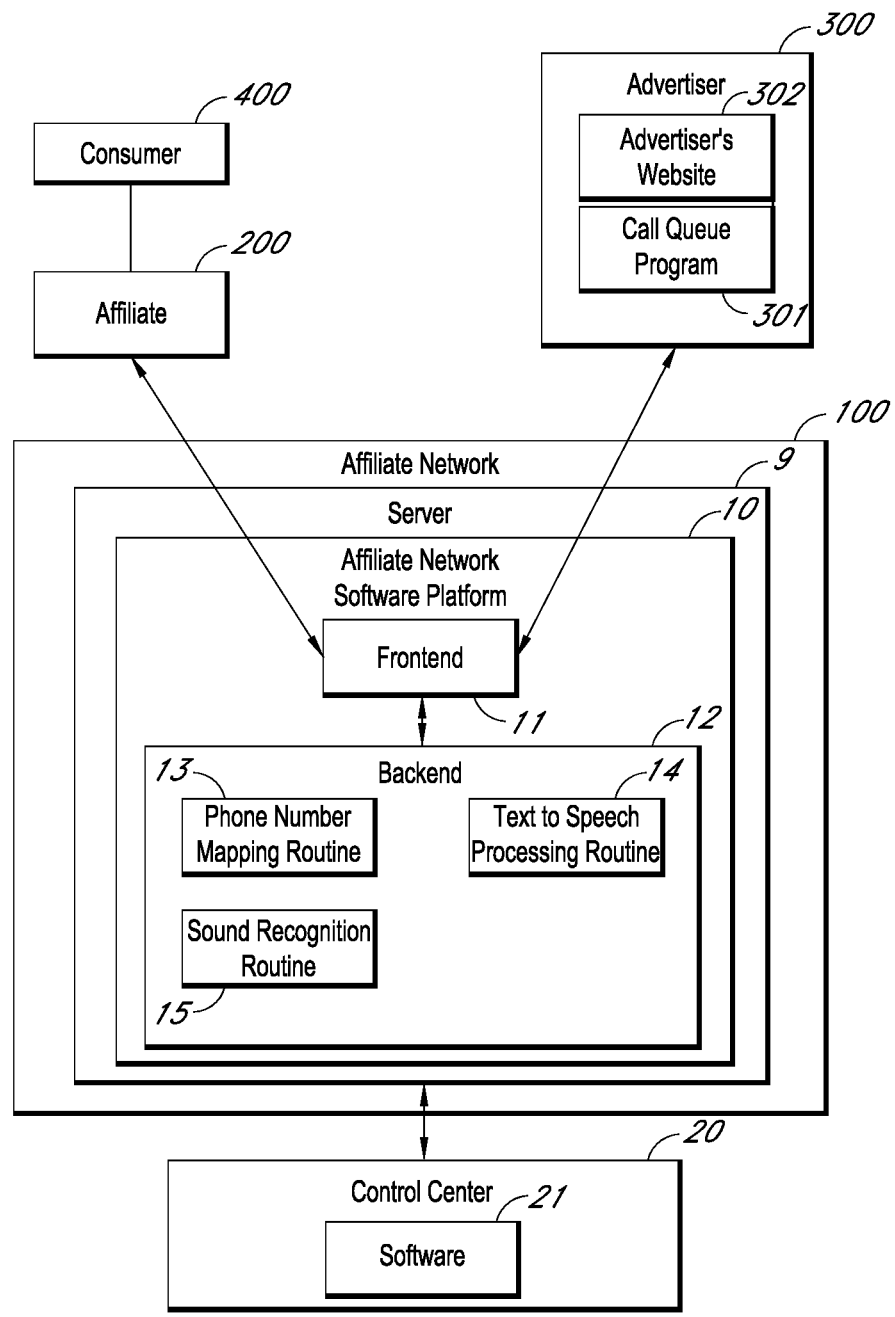
FIG. 1: illustrates an example system architecture.

FIG. 1: illustrates an example system architecture. As described herein, the illustrated system architecture can be used to facilitate telephonic, email, SMS, and other forms of communication. Certain embodiments process and track communications to facilitate online ordering of items, such as products or services. Thus, the illustrated system architecture can optionally be used to reduce the amount of revenue that would be lost by affiliates should a consumer decide to call an advertiser to make the purchase as opposed to ordering the item online via the affiliate Website. Additionally, the illustrated system architecture can optionally be used to increase the amount of revenue generated from offline or online advertising by including promotional contact information in the offline or online media.

As illustrated in FIG. 1, a consumer terminal 400 (e.g., a general purpose computer, an interactive television, a phone with data network capability, a networked game console, etc.) is coupled to an affiliate via an affiliate system 200 (which optionally hosts a website on a web server) over a network (e.g., the Internet). The affiliate system 200 is coupled over a network (e.g., the Internet) with an affiliate network via affiliate network system 100. The affiliate network system 100 includes a network interface, a server 9, and an affiliate network software platform 10 which executes on the server 9. The affiliate network software platform 10 includes a frontend 11, which communicates with the affiliate system 200 and with an advertiser system 300 (which includes a website 302 hosted on a web server, a call queue program 301, and a user terminal).

The affiliate network system 100 includes a backend 12. The backend 12 includes phone number mapping software 13, a text to speech system 14, and a sound/speech recognition system 15. The server 9 is coupled via a network to a control center system 20, which includes software 21.

Figure 3:
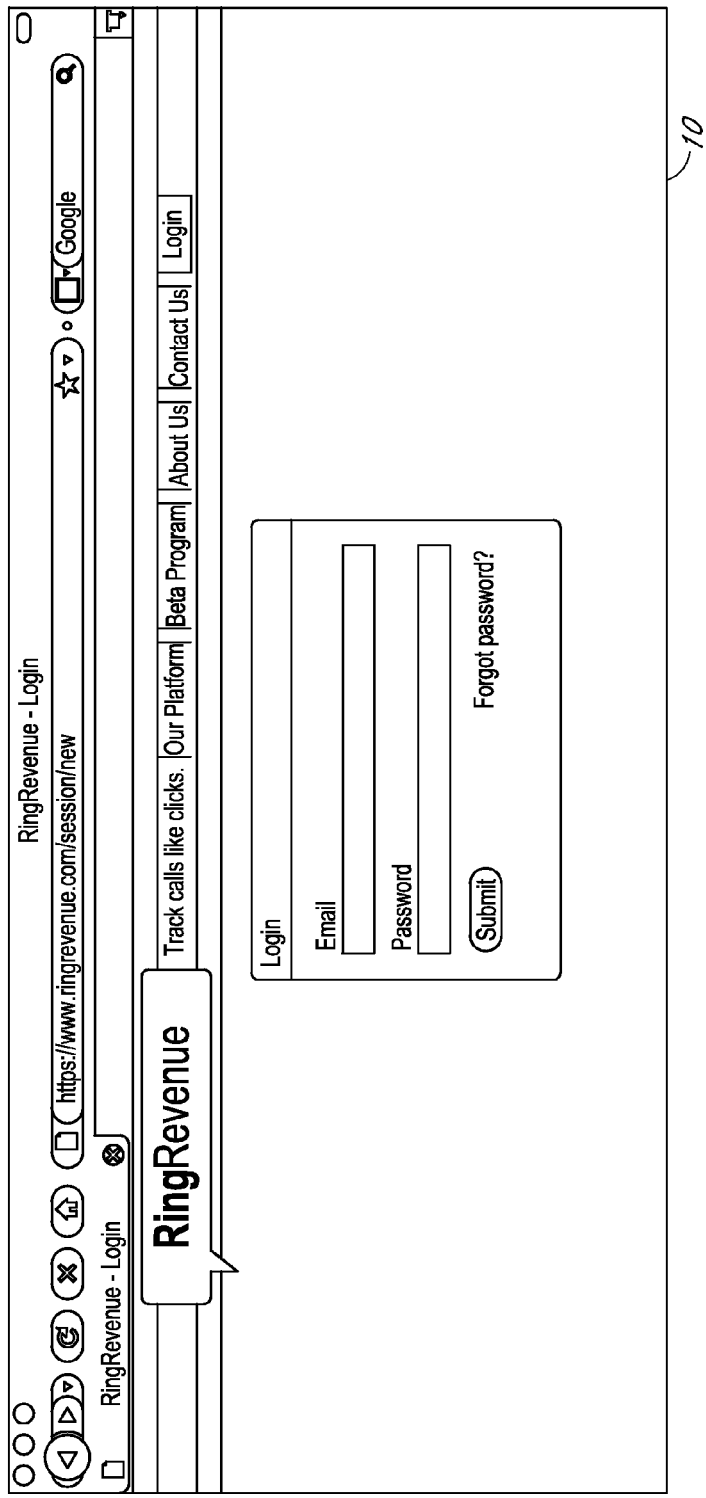
FIG. 3: is an illustration of an example embodiment of a login user interface of the software platform.
Figure 12:
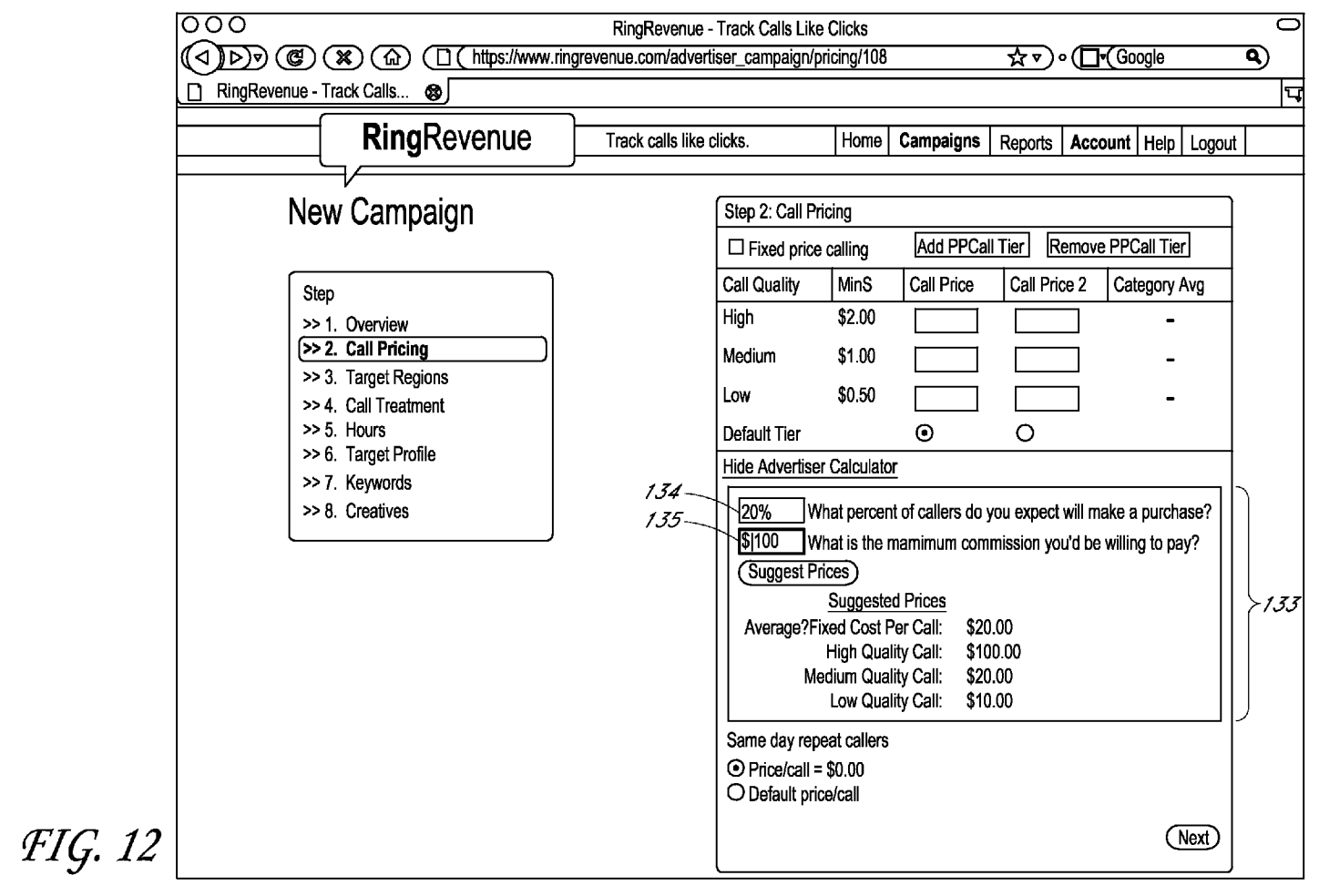
Figure 13:
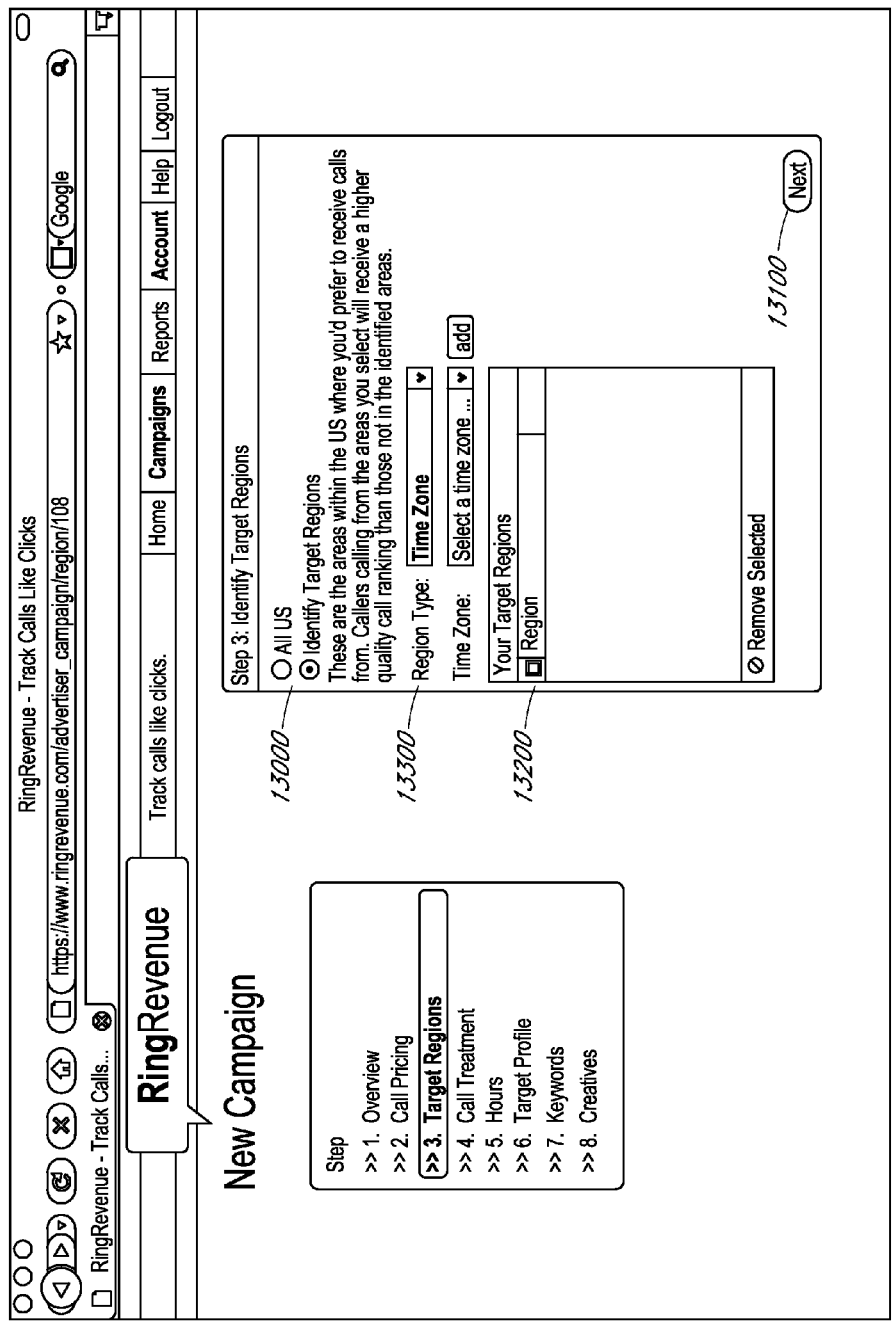
FIG. 13: is an illustration of an example embodiment for creating a new campaign which illustrates a target regions submodule.

As shown in FIGS. 1 and 3, in an example embodiment, the advertiser, via the advertiser system 300 logs into affiliate network software platform 10. The frontend software 11 is responsible for rendering the html code that the web browser of an advertiser or affiliate interprets. The backend software 12 is responsible for performing some or all of the processing, mapping, and database operations of the affiliate network website 302. The phone number mapping routine 13 included in the backend software 12 is responsible for mapping a promotional phone number to destination phone number 141 (as discussed in greater detail below with respect to FIGS. 12 & 13). The text to speech processing routine 14 is responsible for creating audio files of the text entered into the IVR routine of FIG. 15. The sound recognition routine 15 enables the backend 12 to recognize voice commands or telephone key tones for example. In the embodiment shown in FIG. 1, the control center 20 can route information, software, or permissions to the affiliate network system 100 using its own control center software 21.

In an example embodiment, the platform software 10 and the control center software 21 run by the affiliate network system 100 and the control center 20 perform some or all of the following functions: an advertiser function, as illustrated in FIG. 4, an affiliate function, as illustrated in FIG. 21, an affiliate network system function, as illustrated in FIG. 28, and a control center 20 function (not shown.)

Figure 6:
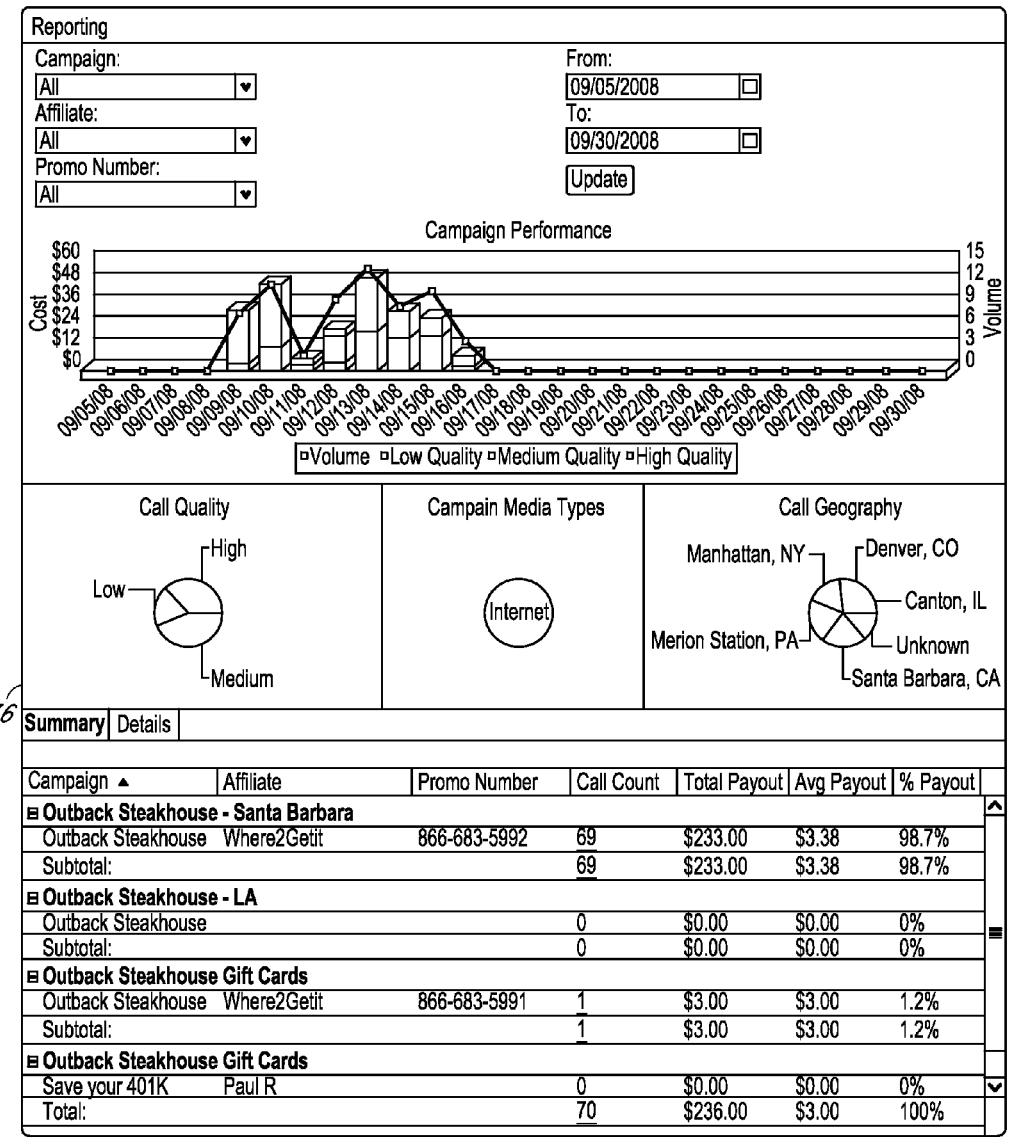
FIG. 6: is an illustration of an example embodiment for viewing advertiser report information.
Figure 9:
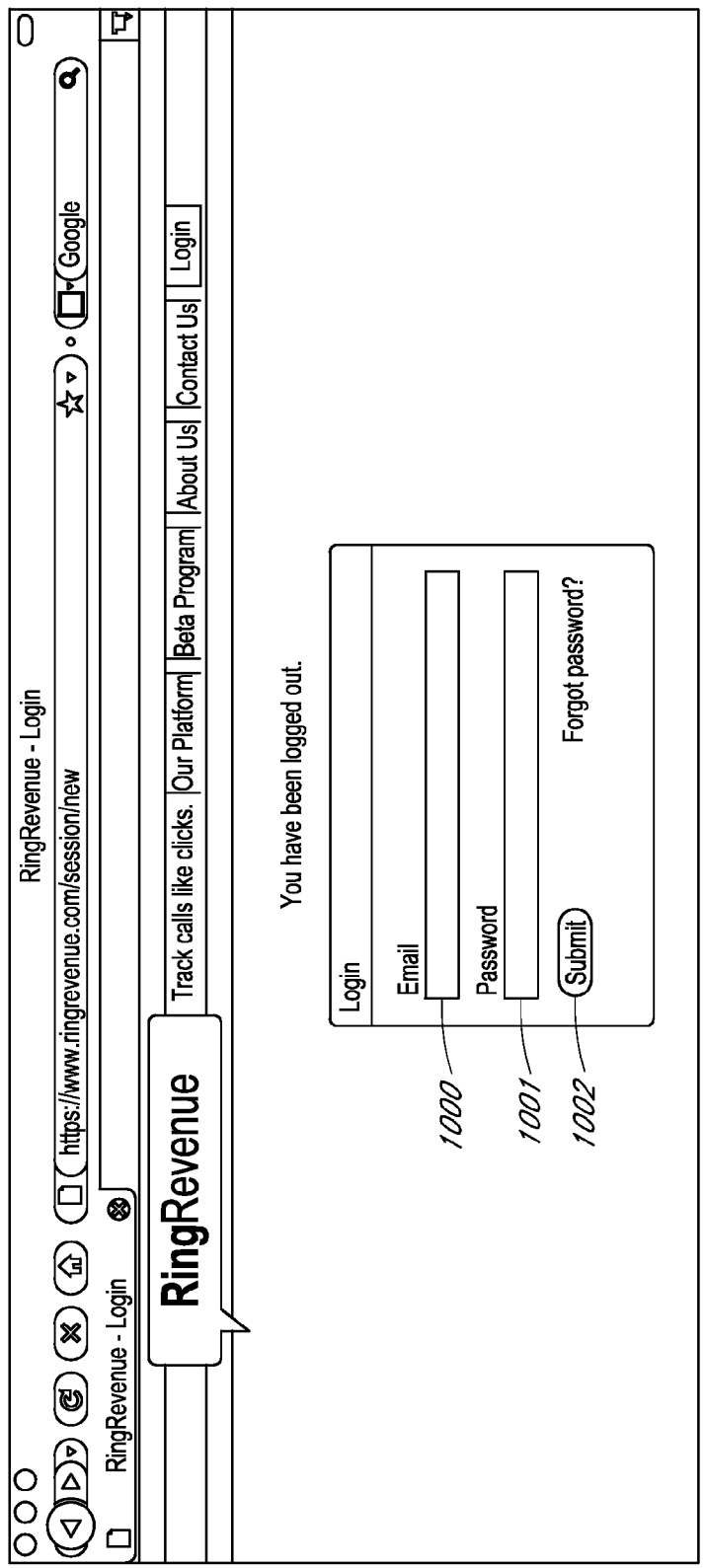
FIG. 9: is an illustration of an example embodiment for logging out of the software platform.

Once logged in, the advertiser can view various types of information on a home screen user interface 30, such as that illustrated in FIG. 4, view various campaign information (see, for example, FIG. 5) or create a new advertising campaign through the create a new campaign module 23 (see, for example, FIG. 5), view various report information with the view campaign module (see, for example, FIG. 6), modify various account information through the account information module 14' (see, for example, FIG. 8), obtain help, logout (see, for example, FIG. 9), or search for various affiliates. In some embodiments the advertiser may make use of the call queue program 301 to queue incoming calls, optionally based on the caller quality (see, for example, target profile submodule 160 FIG. 10).

Referring to FIG. 4, a home screen user interface 30 of the advertiser system 300 optionally includes a notification module 31, a recent calls module 32, and/or a quick stats module 33. Data displayed via the various user interfaces may be read from computer readable memory. The notification module 31 may be used to display a notification to the advertiser. In the embodiment shown in FIG. 4, two types of example notifications are illustrated: an expiration notice 34 and an application notice 35. Other types of notifications can be provided as well. The recent calls module 32 informs the advertiser 300 of the recent calls made by customers 400. The quick status module 33 shows information, such as the number of calls made by consumer 400, the quality of the calls, and cost of the calls (e.g., the cost to the advertiser). The data displayed via the user interface illustrated in FIG. 4 may have been transmitted via the affiliate network system 100 to the advertiser system 300.

Figure 2:
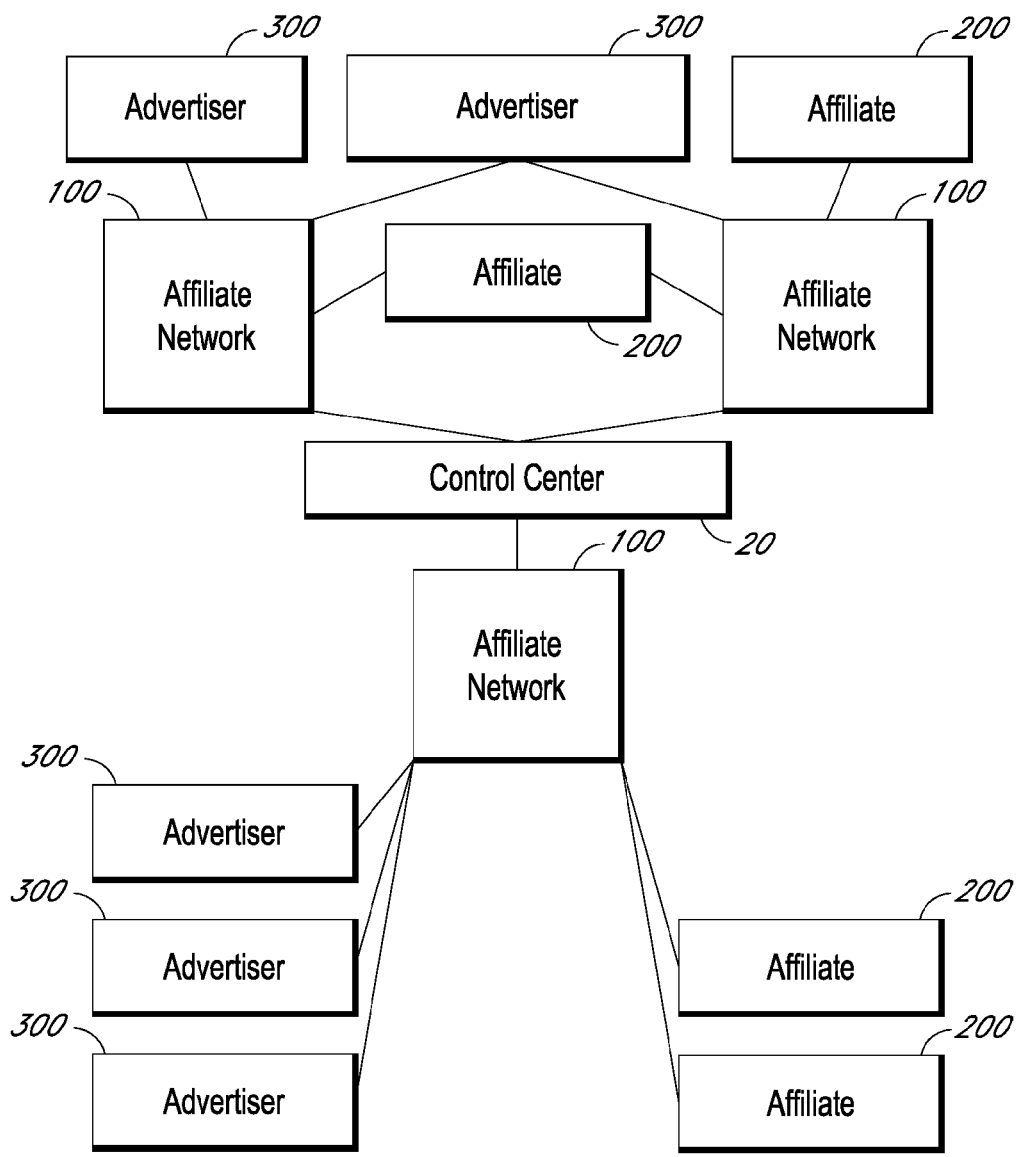
FIG. 2: is a second schematic view of an example embodiment of the relationship between the control center, affiliate network, affiliate, advertiser, and the consumer.

When the affiliate logs in via an affiliate system (e.g., including a server and user terminal), he or she is presented with a home screen user interface, an example of which is illustrated in FIG. 21. The data displayed via the user interface illustrated in FIG. 4 may have been transmitted via the affiliate network system 100 to the affiliate system (such as affiliate system 200 illustrated in FIG. 2). On the home screen 200', a notification module 41, campaign viewing module 42, a campaign application module 47, and/or a quick stats module 49 are provided. The notification module 41 can be used to inform the affiliate of new campaigns posted by advertisers 300, and transmit an alert to the affiliate system 200 if the advertiser 300 accepts the affiliate's application to the campaign. The campaign viewing module 42 allows the affiliate to view campaigns that have been applied and campaigns that have been accepted by the advertiser, as well as optionally campaigns that have been rejected.

In the example embodiment shown in FIG. 21, all the campaigns have been accepted, but the word "applied", for example, could be used to indicate campaigns that have been applied to but not accepted. The campaign application module 47 provides the affiliate the ability to view campaigns that have been made visible to the affiliate 200 via the affiliate network 100 or the advertiser 300 through the campaign visibility module 56'. Advertisers 300 and affiliate networks 100 may be provided with a campaign visibility control 56 illustrated in FIG. 28, which enables the advertiser 300 or affiliate network 100 to restrict the campaigns that affiliates 200 can view. The campaign visibility module 56' is described in more detail with respect to FIG. 29. The quick status module 49 illustrated in FIG. 21 enables the affiliate to quickly monitor the amount and nature of calls his or her promotional activity has generated as well the resulting commissions due.

When the affiliate network operator logs in the affiliate network 100 (see FIG. 1A), the operator is presented with a home screen 100', an example of which is illustrated in FIG. 28. This home screen user interface 100' may provide the affiliate network operator 100 with a view network status module 51, a view advertisers module 54, and/or a view affiliates module 55. When the affiliate network system operator click on a link (or other activation controls) in the view advertisers module 54, the new page delivered to the affiliate's computer may be the same as, or similar to the home screen user interface 30 of the advertiser 300 illustrated in FIG. 4. Similarly the affiliate can click on a link in the affiliate's module 55, and the new page delivered to the affiliate network's computer may be the same as the home screen user interface 200' of the affiliate, an example of which is illustrated in FIG. 21.

When the control center operator logs in, the control center operator is presented with a home screen user interface (not shown) which enables the control center operator to view the home screen user interfaces of the various affiliate networks 100. In some embodiments there may be more than one control center 20 (e.g., located in different geographic areas, such as different states or cities, or located in the same area) and more than one control center operator. In the example embodiment shown in FIG. 2, there is one control center 20, and three affiliate networks 100, although there can be additional control centers and fewer or more affiliate networks 100. An affiliate network 100 is associated with one or more advertisers (which in turn are associated with one or more advertiser systems 300) and affiliates (which in turn are associated with one or more affiliate systems 200). In the embodiment shown in FIG. 2, several advertisers and affiliates are registered with more than one affiliate networks (which in turn are associated with one or more affiliate network systems 100).

The Add New Campaign Module

Figure 10:
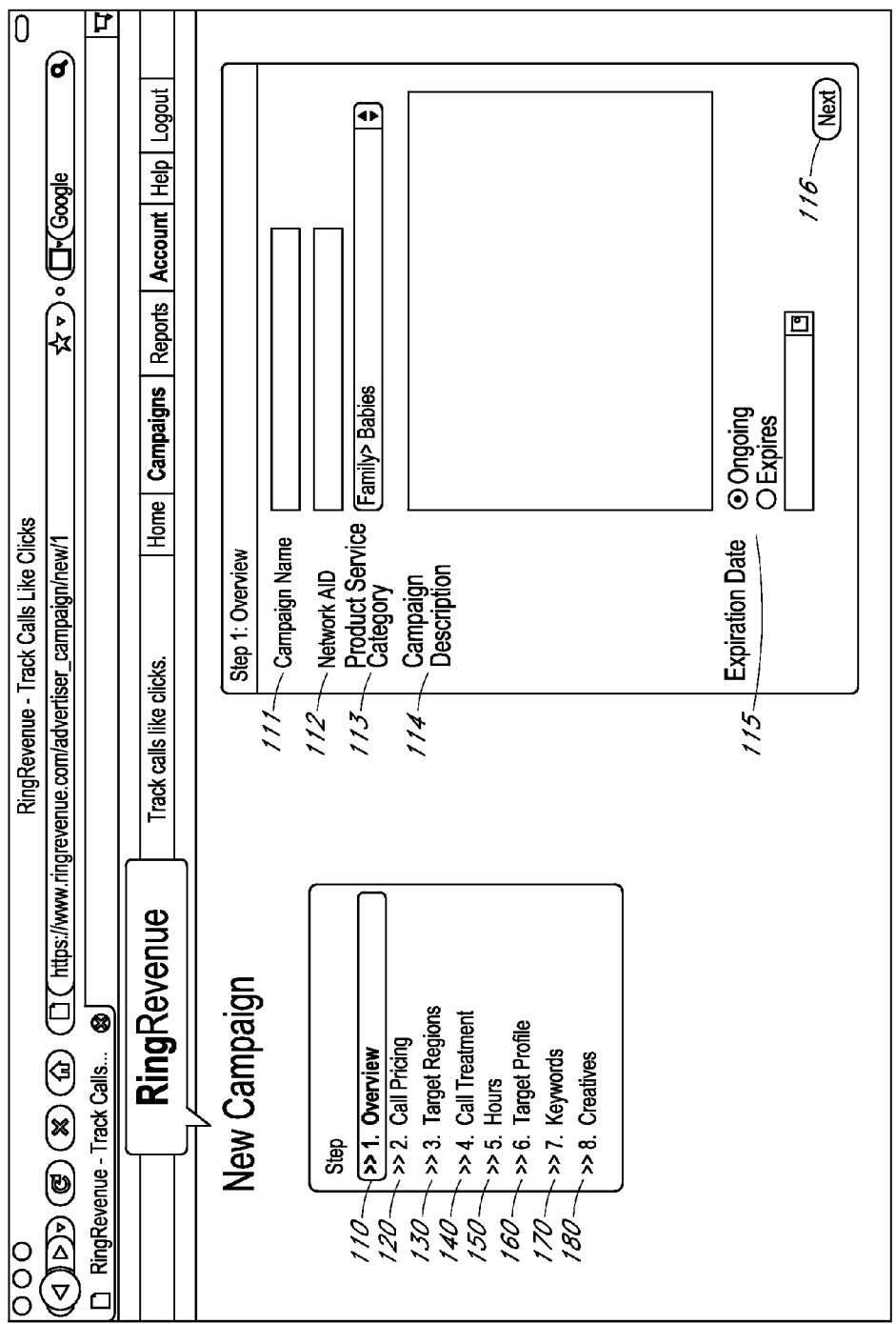
FIG. 10: is an illustration of an example embodiment for creating a new campaign which illustrates the overview submodule.

As shown in FIG. 5, the advertiser has the ability to add a new advertising/affiliate campaign using the add new campaign module or button/control 23. As shown in FIG. 10, in an example embodiment of the new campaign software module 23, the advertiser 300 is presented with a form or a help wizard tool which provides the advertiser 300 with the following submodules: overview 110, call pricing 120, target regions 130, call treatment 140, hours 150, target profile 160, keywords 170, and creatives 180. FIGS. 10-20 illustrate example user interface corresponding to these submodules). Fewer, additional or different submodules may be used.

With reference to FIG. 10, in the overview submodule 110, the advertiser can enter information such as campaign name in a campaign name field 111, network information in a network information field 112, product, services, or category information in a product, services, or category field 113, and campaign description in a campaign description field 114. A campaign name may be used to identify the campaign. Product, services, or categories enables affiliates to look for campaigns by their type (handbags, computers, legal service, etc.) Campaign description provides information to affiliate such as information concerning the advertiser, the terms and conditions of the advertisement, and details about the campaign requested.

Figure 11:
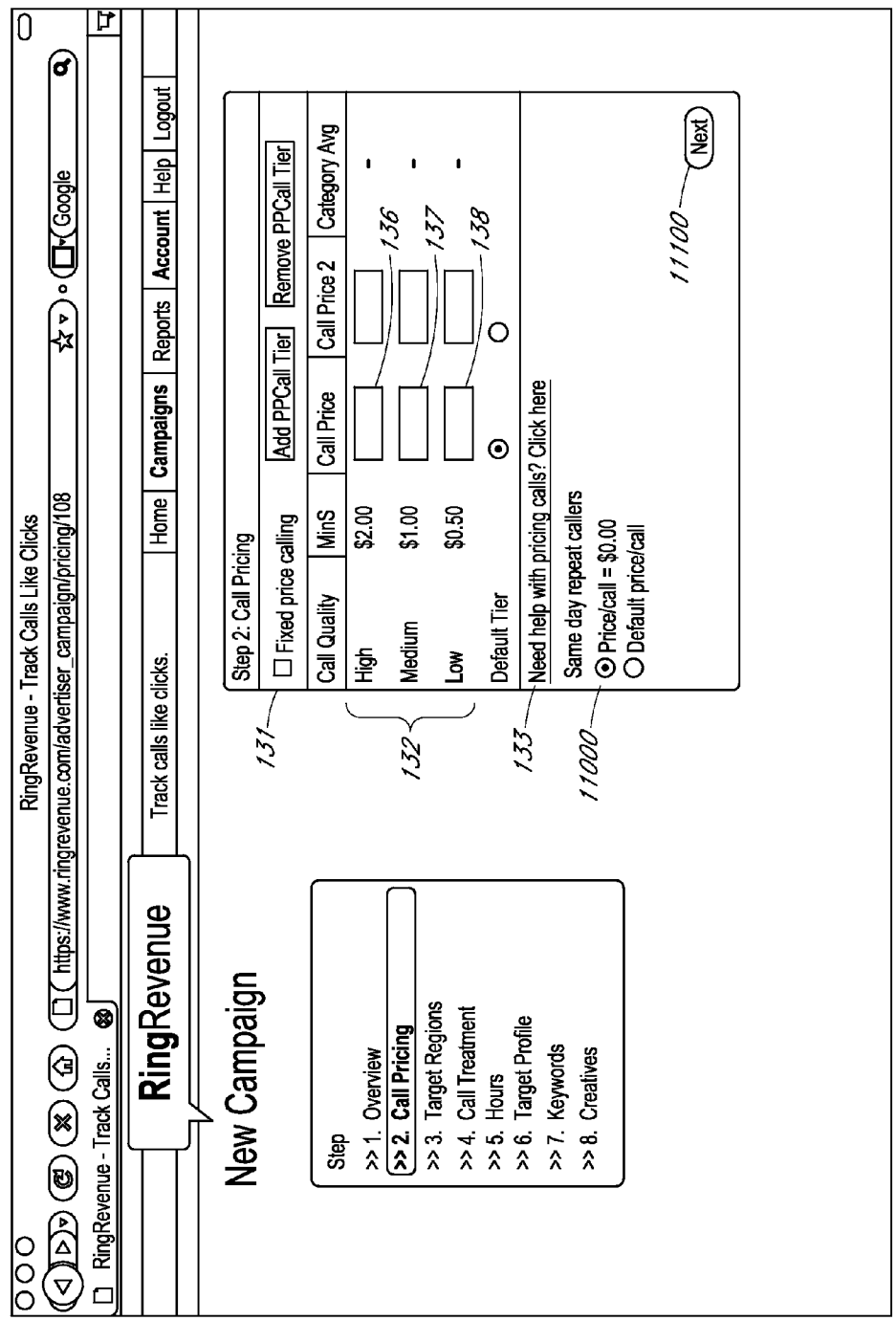
FIG. 11: is an illustration of an example embodiment for creating a new campaign which illustrates a call pricing submodule.

In the call pricing submodule 120, the advertiser 300 has the ability to choose either fixed call pricing 131, or a dynamic call pricing 132 (e.g., based on call quality). As shown in the embodiment of FIG. 11, the advertiser 300 can choose separate prices for high 136, medium 137, and low 138 quality calls. (While the specification describes three levels of quality, high, medium, and low, different quality labels can be used wherein each label is optionally priced differently. For example, quality labels 1-100 can be assigned based on different call criteria. Optionally, call quality labels are not assigned. For example, the call quality and price can be determined by certain call criteria being achieved during a call.) The backend or processing section 12 of the website running on the affiliate network server or the control center 20 server uses a novel method of determining call quality which is discussed in the section relating to submodule 160, FIG. 10.

Dynamic call pricing enables advertisers to price calls differently based on specific call criteria (e.g., the time of day of the call, call length, caller responses to interactive voice response menus, caller gestures (e.g., selection of a specific advertisement), spoken keywords, etc.) Calls can optionally be priced the same or differently for different publishers even if the call criteria is the same. Optionally, fixed call pricing is established at a base price per call and bonuses are added on top of the fixed per call price if certain call criteria are met. The call pricing submodule 120, also may comprise a call price calculator 133 which aids the advertiser in determining the call price. By asking the advertiser 300 what percentage of calls are converted into sales 134, and what is the maximum amount of compensation the advertiser is willing to pay 135, see FIG. 12, the call price calculator, which receives and provides data for display via price calculator user interface 133 can use this information to suggest high 136, medium 137, and low 138 call pricing. Other call price distribution systems such as 1 star-5 star rating are also contemplated. The calculator can use a variety of algorithms to perform this calculation. For example, the calculator might set the high call price 136 to be equal to maximum the advertiser is willing to pay 135. The calculator may determine the medium call price 137 by multiplying the percentage of calls converted into sales 134 by the maximum the advertiser is willing to pay 135. The calculator may further determine the low call price 138 by halving the medium call price 137. The determinations can be displayed by the calculator via calculator user interface 133. Other techniques may be used.

In the target regions submodule 130, the advertiser 300 can restrict the geographic regions from which it wishes to receive calls. Additionally, in certain embodiments, particular regions within the country(ies) can be chosen as well. In the embodiment shown in FIG. 13, the advertiser 300 can restrict calls to specific regions 131 such as states or specific cities in states, time zones 132. As will be discussed in call treatment submodule 140, the advertiser 300 enters a destination phone number 1141. As described in the campaign application module 47, see FIG. 21, the affiliate 200 requests a promotional phone number (in some embodiments a toll free phone number) from the affiliate network 100 or from the control center 20. The phone number mapping routine 13 (FIG. 1) maps the promotional phone number to the destination phone number 141 using the phone number mapping routine 13 (in some embodiments, the control center's server may include the phone number mapping routine.) This routine causes the server 9 to route calls coming into the promotional phone number to the destination phone number 1141. Through this optional mechanism, the affiliate network 100 or the control center 20 never actually transfers ownership or control of the origination phone number to the advertiser 300 or affiliate 200, but rather it provides the affiliate 200 with a revocable ability to use the promotional phone number for advertising. In some embodiment the control center 20 may transfer a group of promotion numbers to the affiliate network 100. Through this mechanism a promotional phone number may be assigned on the internet (e.g., to an advertising campaign for a product or service). In some embodiments, the promotional phone number can be assigned immediately, without intervention by personnel working for the affiliate network 100 or the control center 20. Optionally, the phone number is also activated and ready to receive calls substantially immediately (e.g., with 5 minutes, 30 minutes, 1 hour, 2 hours). The affiliate network 100 or control center 20 can maintain control over the promotional phone number at all times and can terminate routing the promotional phone number to the destination phone number for whatever reason the affiliate network 100 or the control center 20 may deem necessary.

Figure 15:
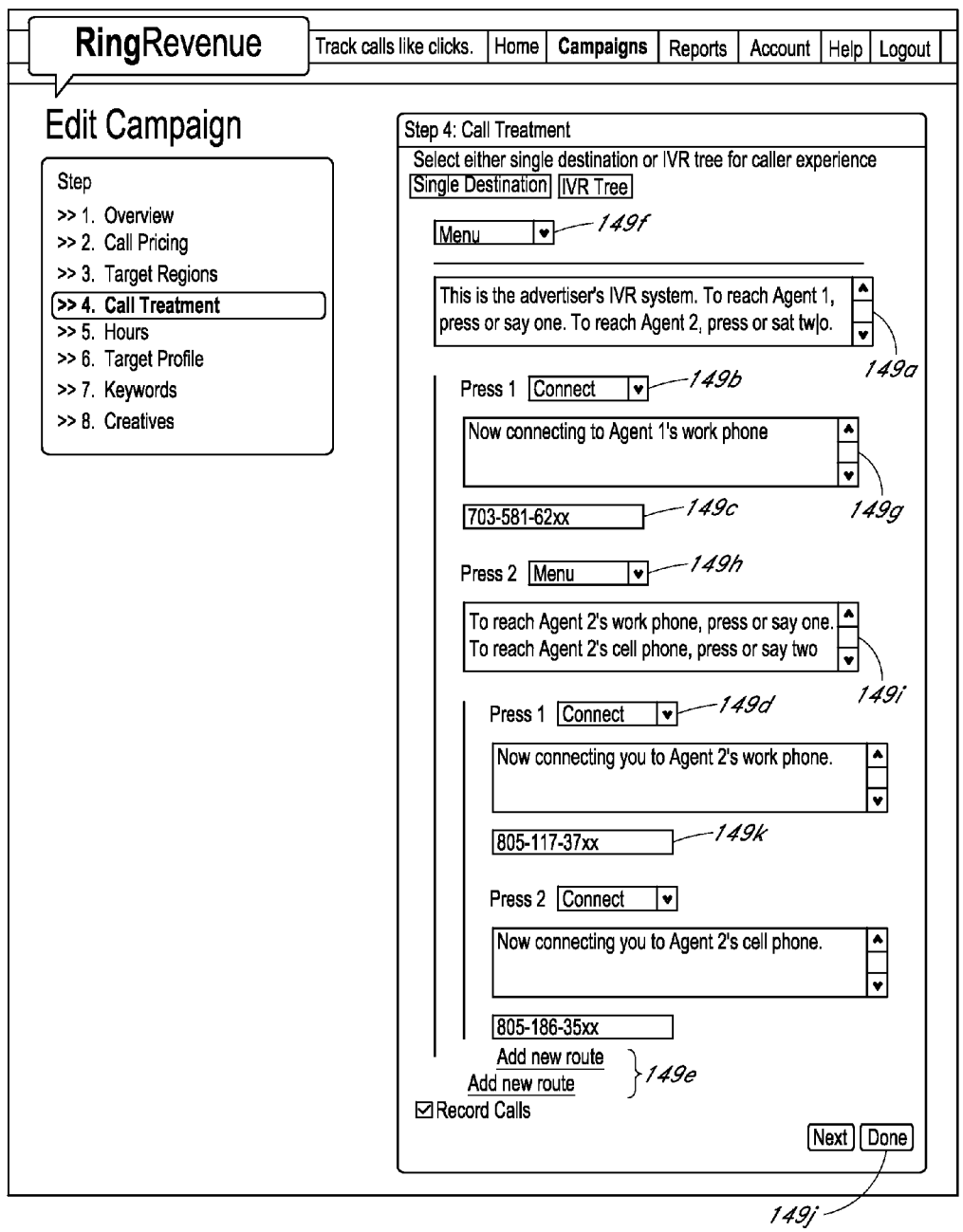
FIG. 15: is an illustration of an example embodiment for creating a new campaign which illustrates the target regions submodule utilizing the IVR routine.
Figure 19:
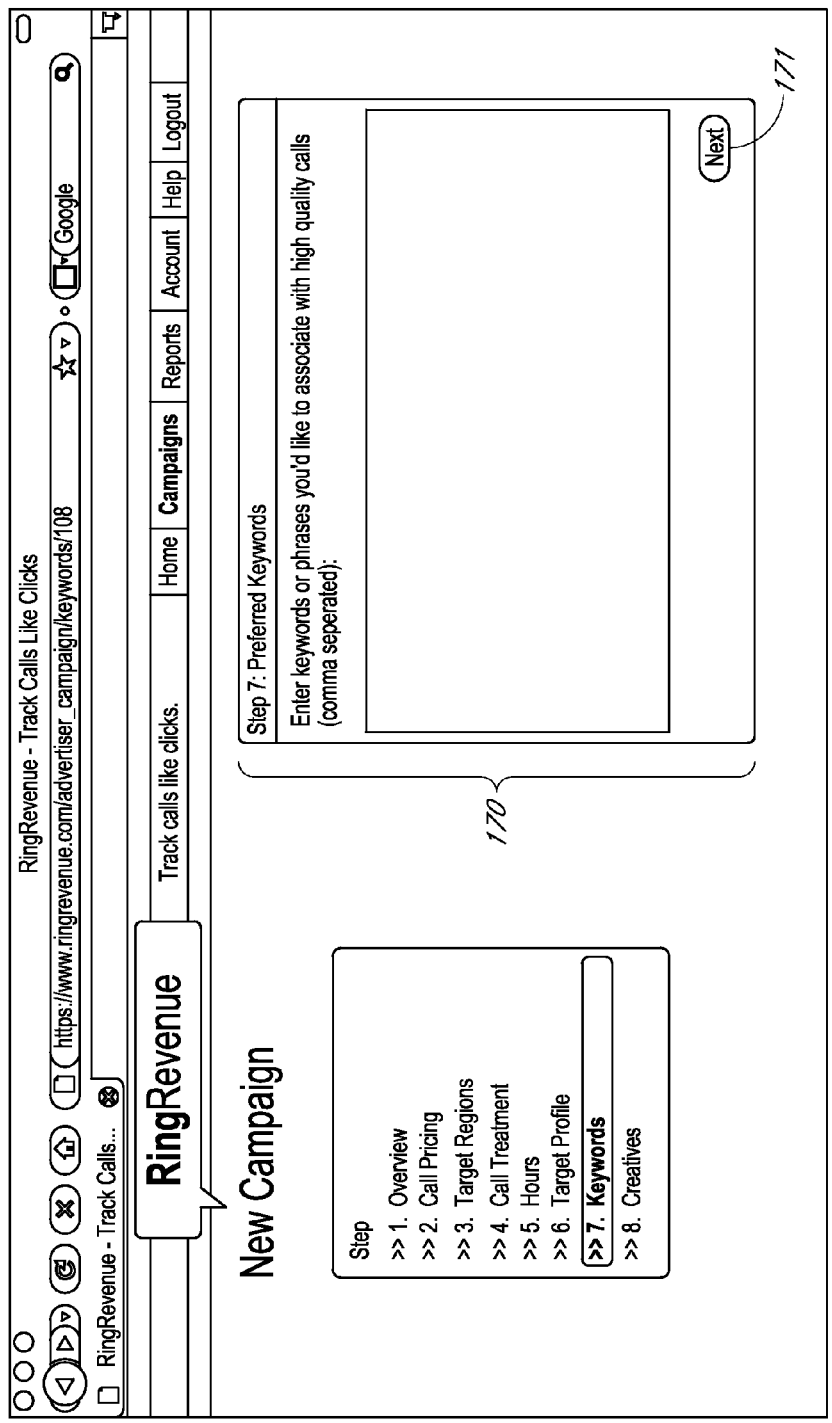
FIG. 19: is an illustration of an example embodiment for creating a new campaign which illustrates a keywords submodule.
Figure 20:
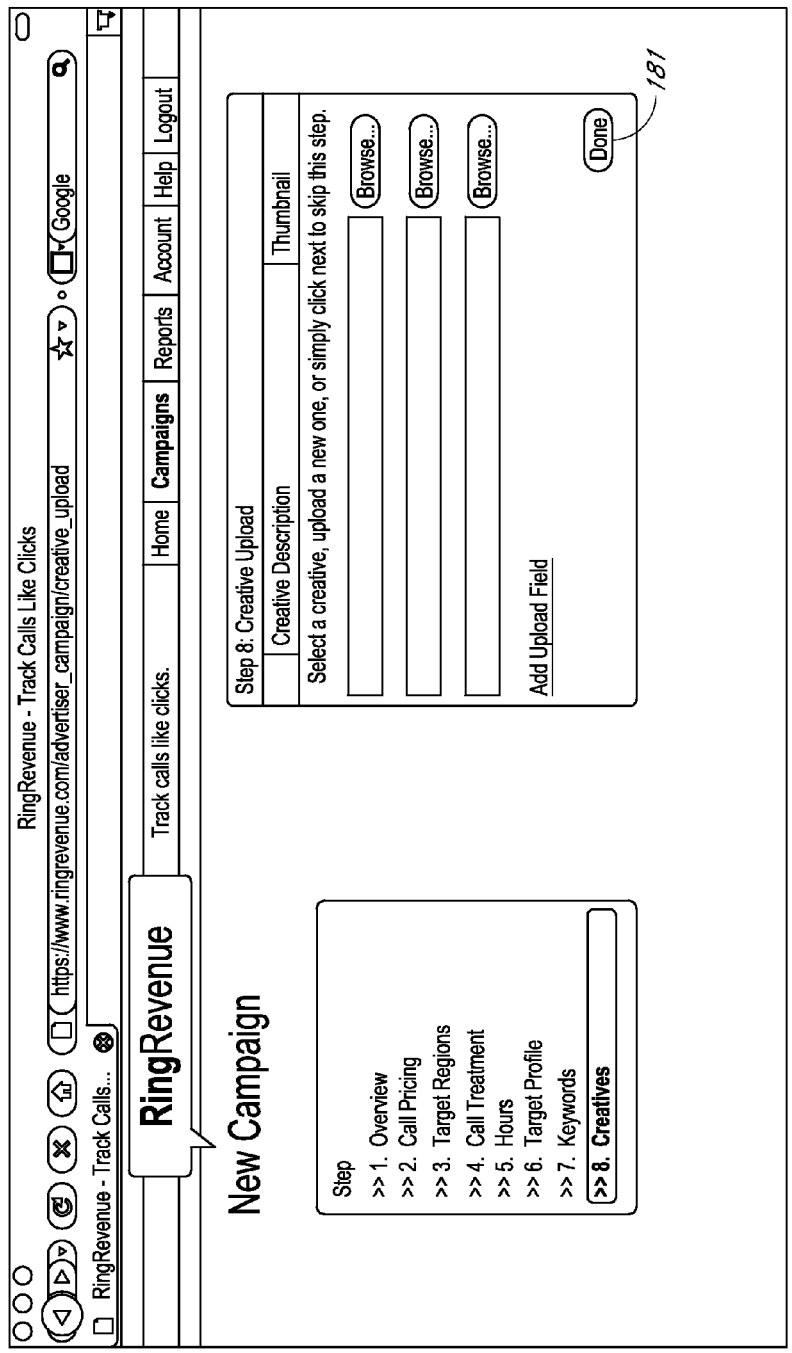
FIG. 20: is an illustration of an example embodiment for creating a new campaign which illustrates a creatives submodule.

In the call treatment submodule 140, the advertiser 300 can set how incoming calls to the destination phone number 141 are treated. See FIG. 14. In the single destination routine 147, advertisers 300 can choose to have calls recorded 142 or have SMS marketing messages 143 transmitted to the consumers 400. An advertiser can setup a promotional code 144 and advertising message 145 to be sent to the consumer's 400 mobile phone, Skype phone, or computerized phone equipment. This method of generating one or more SMS messages and codes which can be sent to a consumer, allows the advertiser to dynamically change the messages sent or codes promoted by simply editing this campaign setting. Additionally, the advertiser can send advertisements at a later time 146 (such as the next day, week, or month) to increase the number of sales generated. Optionally the SMS messages contain a promotional number which may be called by the user. Additionally, in the IVR tree routine 148, an advertiser can set up an IVR system (interactive voice system) which allows an advertiser to provide customers the ability to operate a voice menu system. In an embodiment of the IVR routine 148, as shown in FIG. 15, the advertiser can use the system to route calls made to promotional phone number to different agents. For example, in the embodiment show in FIG. 15, the consumer 400 can press one to speak with Agent 1, or press two to speak with Agent 2. In some embodiments the sound recognition routine 15 of the backend can be designed to recognize the spoken words "one" or "two" in addition to key tones. The text to speech processing routine 14 converts the text shown in text box 149*a*. Upon pressing "one" in the embodiment shown in FIG. 15, the backend 12 will connect 149*b* the calling consumer 400 with Agent 1 by bridging the call to Agent 1's telephone number 149*c*. Pressing "two", will bring up a new menu 149*d* which allows the calling consumer 400 to call either Agent 2's cell or work phone. The "add new route" button or hyperlink 149*e* allows additional options to be created such as a third destination to call Agent 3, for example.

Figure 16:
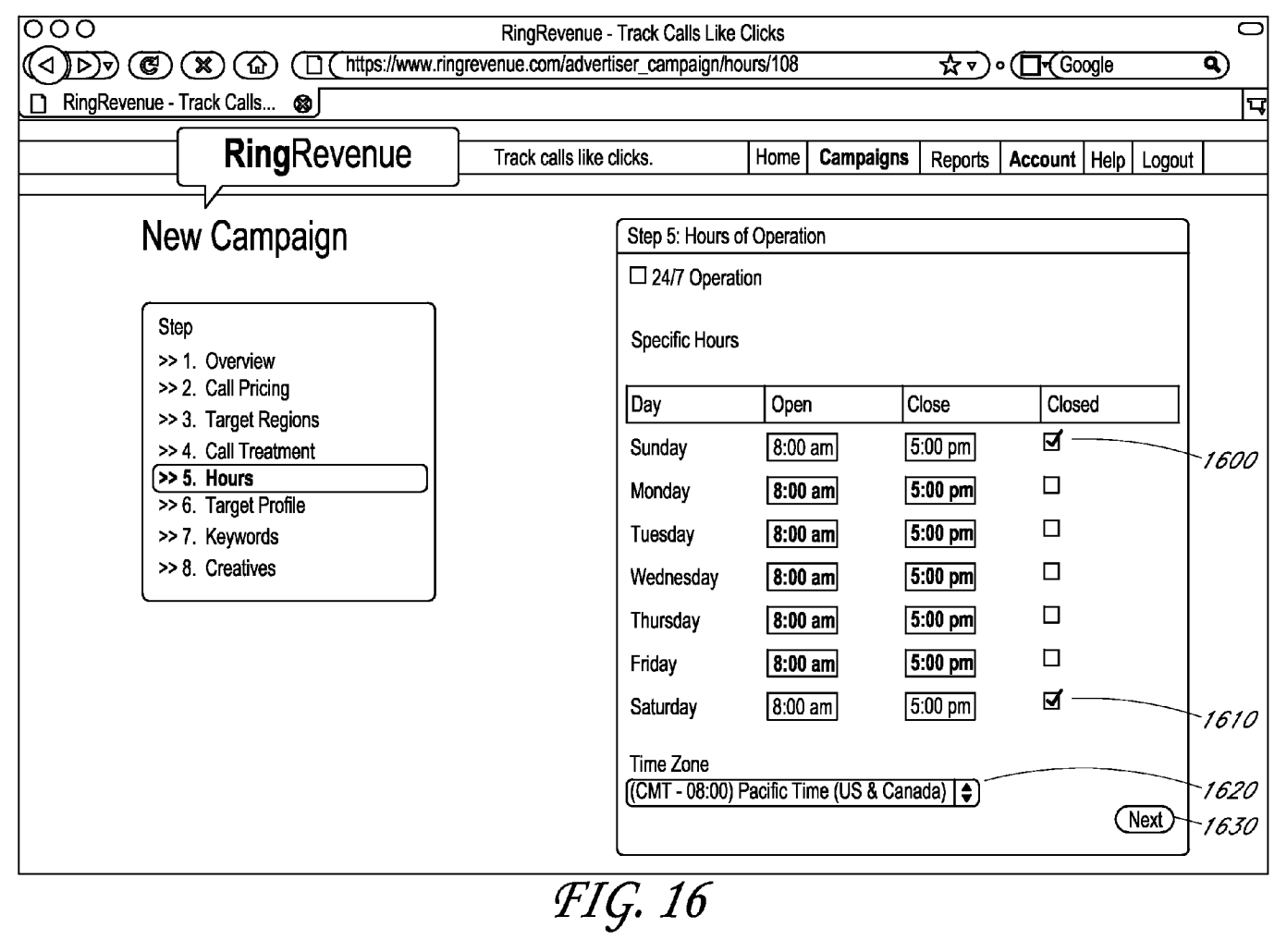

In the hours submodule 150, the advertiser can set the times each day it wishes to receive calls. FIG. 16. Setting the time in this submodule may allow the advertiser 300 to avoid paying affiliate commissions at hours when the advertiser 300 is not in business for example. Moreover, this feature may allow the advertiser to route calls to voicemail or to home telephone numbers when the advertiser is closed.

In the target profile submodule 160, the advertiser 300 can set various criteria to be used in the determining whether a customer is high, medium, or low quality. FIG. 10. The target profile criteria 162 may include subcriteria such as gender, age, household income, marital status, education, ethnicity, and calling from number. Much of the data used to evaluate these subcriteria can be obtained through looking up the consumer phone number against demographic data bases. In the embodiment shown in FIG. 18 clicking on the show all field 161 expands all the fields and display the screen shot shown in FIG. 18. In this example embodiment, clicking on an individual checkbox expands the particular subcriteria selected. As shown in FIG. 18, the advertiser 300 may decide that the gender 163 for example is important in determining whether the particular customer 400 calling is a high, medium, or low quality caller. For example if the advertiser 300 is selling makeup, the advertiser may choose to place the slider high for women and low or none for men. This allows advertisers 300 to communicate to affiliates more effectively about which customers might purchase the advertisers 300 goods and services. In certain embodiments, the advertisers may be able use these subcriteria to filter out certain customers completely. In cases, such as gender, women might be much more likely to purchase an item than men, and the advertiser 300 may be willing to pay more for the sales lead if a woman calls as opposed to a man for example. The subcriteria of age, household income, marital status, education, ethnicity, and calling from may be similarly be used to determine the quality of the consumer.

Advertisers 300 can make use of the call quality of consumers in a variety of ways. First, as previously explained, advertisers 300 optionally set different payment amounts for high, medium, and low quality calls. Second, advertisers 300 optionally route certain quality calls to their stronger salespersons to increase the likelihood of consummating the sale. Moreover, the particular demographic information could be used to pair an appropriate salesperson to the particular customer. For example, using available sales statistics, the advertiser 300 may decide that a single male in the 25-34 age range would more likely buy products from the advertiser 300 if the agent who answers the call is a single female in the 18-34 age range. Third, Advertisers 300 optionally setup their call queuing software to bump higher quality callers up in the queue to reduce the higher quality caller's wait time. Some advertisers 300 use a call queue program to queue customers' calls so that customers do not receive voicemail or a busy signal. Rather they are placed in a call queue, which allows the advertiser 300 to answer the caller as soon as an agent is made available.

In the keywords submodule 170, advertiser 300 can also specify certain keywords that the backend sound recognition routine 15 can identify for the purpose of rating calls. Certain keywords such as competitor names, product names or types can be identified to establish the quality of the caller. Similarly the utterance of certain words by the consumer 400 may establish dissatisfaction with the product, advertiser, or agent. In some embodiments, the sound recognition routine 15 can distinguish between the voice of the consumer and that of the advertiser, either by sound or by receiving information relating to the source of the sound (i.e. from which phone number/call leg the voice is received.) In the embodiment just described, the keywords submodule 170 determines call quality during and after the call from the consumer 400 is made, and the target profile submodule 160 can begin determining call quality once the consumer 400 calls the advertiser 300.

In the creatives submodule 180, the advertiser 300 can upload a creative 180' such as an image or a banner for use by the affiliate 200 in campaigning for the advertiser 300. As explained later in the section discussing the creative module 180, the affiliate may have the option to add the promotional phone number to this creative to improve the affiliate's promotional ability. The done button 181 can be selected to save the entered information into the campaign. Similarly when editing the campaign 24 the done button saves the changes made to the campaign 24.

Measuring and Tracking Call Quality

In certain embodiments, users of the software platform 10 may be able to utilize call quality techniques to improve their advertising experience. Accurately determining call quality may be useful for the advertiser 300 as it may provide the advertiser 300 with a way of rewarding the affiliate 200 with additional compensation for good quality calls, while at the same time allowing the advertiser 300 to avoid paying high commission fees for lower quality calls. Through adjusting the various target profile subcriteria in the target profile submodule 160, the advertiser may enable the software platform 10 to determine demographic information about the customer 400. In the embodiment shown in FIG. 17, the advertiser 300 can adjust sliders to increase the weight associated with the customer having certain demographic subcriteria, but alternate methods of saving this information optionally might be used. Additionally, the advertiser 300 can use the keyword submodule 170 to enable the software platform to determine the quality of the call. When customers/consumers 400 or advertisers 300 use these keywords, the software platform can monitor or record their enunciation and appropriately raise the quality of the call. In some embodiments, the software platform 10 might utilize algorithms to adjust the significance of the utterance of the keyword based upon the syntax (position in the sentence), voice modulation (is the keyword stressed in the sentence), repetition, variants of the keyword (ice skating vs. ice skates for example), or use of synonyms for the keyword. The software platform 10 may also suggest possible keywords, or check the spelling of keywords. Through analyzing the various scores generated through the target profile information and the keyword information, the backend 12 of the software platform 10 can assign a quality rating to the call.

In certain embodiments, affiliates 200 may be informed of the various subcriteria and keywords set in the campaign, and in other embodiments this information may be kept from the affiliate 200. In embodiments where this information is disclosed, the affiliate 200 can use the information to modify how the advertiser's 300 goods and services are marketed. Another benefit of the call quality feature in certain embodiments, is that it may reward those affiliates 200 that provide advertisers 300 with better customer leads or more sales, while placing a disincentive to the affiliate 200 to provide the advertiser 300 with lower quality calls.

Additional Features of the Advertiser Function

Figure 7:
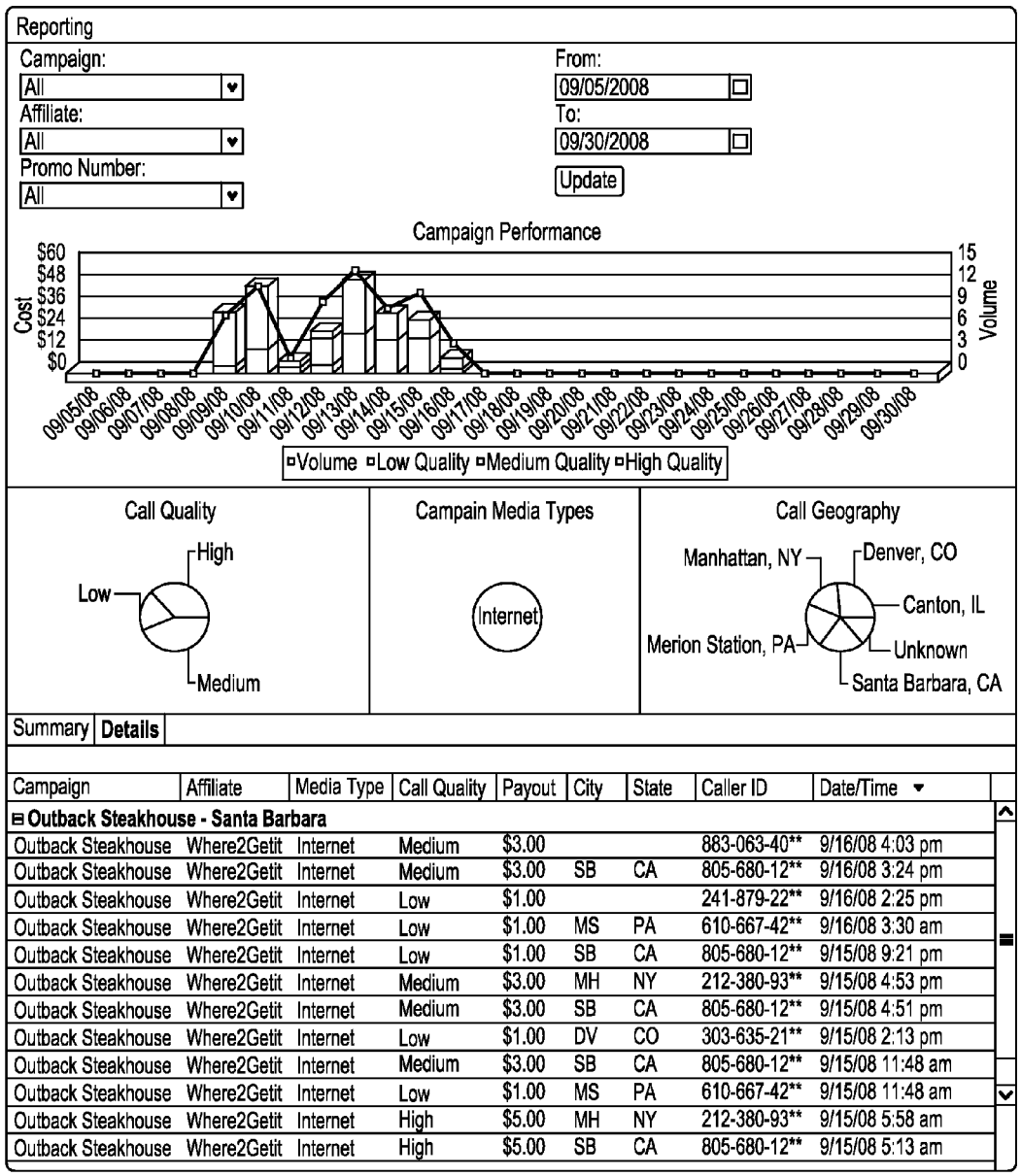
FIG. 7: is an illustration of an example embodiment for viewing alternate advertiser report information.

The advertiser can view an advertising report by clicking on the report button 36, FIG. 4. This brings up the advertiser report module shown in FIG. 6. Through clicking on the details button 36', the advertiser can find additional details about the campaign progress, FIG. 7.

FIG. 5 shows the view campaign module 13' which allows the advertiser 300 to view various campaigns 24.

Figure 8:
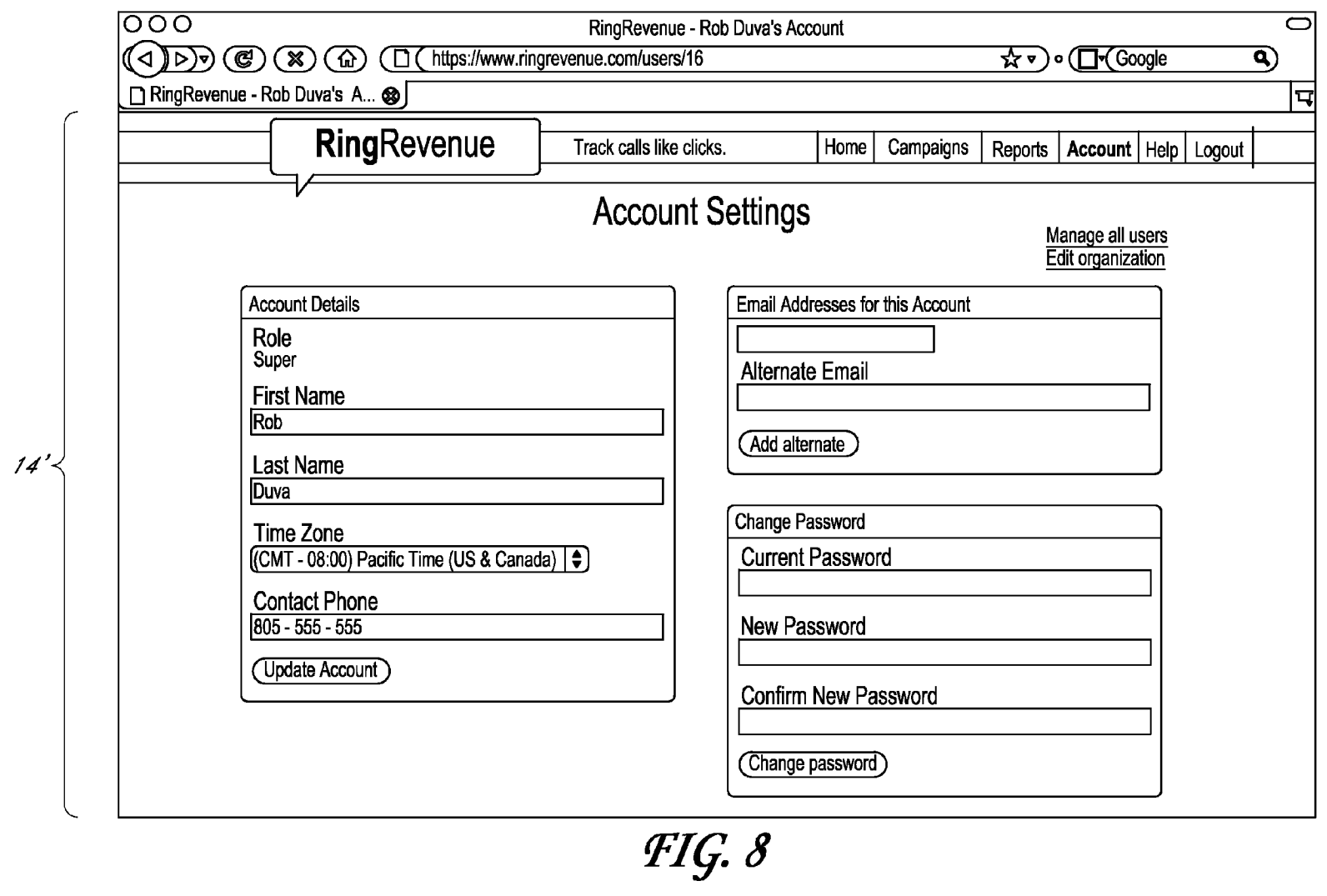

FIG. 8 shows how the advertiser can modify his or her account information. Embodiments of present invention may include the ability to invite additional members or users under a particular advertisers account.

The advertiser optionally is provided with a referral customization module (not shown), which allows the advertiser 300 to specify time of day, particular days, or duration of time in which it will pay referrals. This referral customization module can also be used to specify whether the advertiser would like click-to-call functionality enabled on their website. If so, the click-to-call functionality may be enabled so that an affiliate information object passes the affiliate's information into the click-to-call dialogue box.

Additionally, advertisers may be provided with a self-promote module (not shown), which allows advertiser's to act as their own affiliate or for monitoring the effectiveness of their own advertising techniques which may be managed directly or not through an affiliate 200. Using this self-promote module, the advertiser is provided access to a promotional phone number, promotional email (not shown), etc, which is routed to the advertiser's 300 destination phone number. In such a self-promote module, the advertiser might still be charged fees for the use of data tracking features and call routing features of the affiliate network 100 or the control center 20.

Affiliate Function

Figure 25:
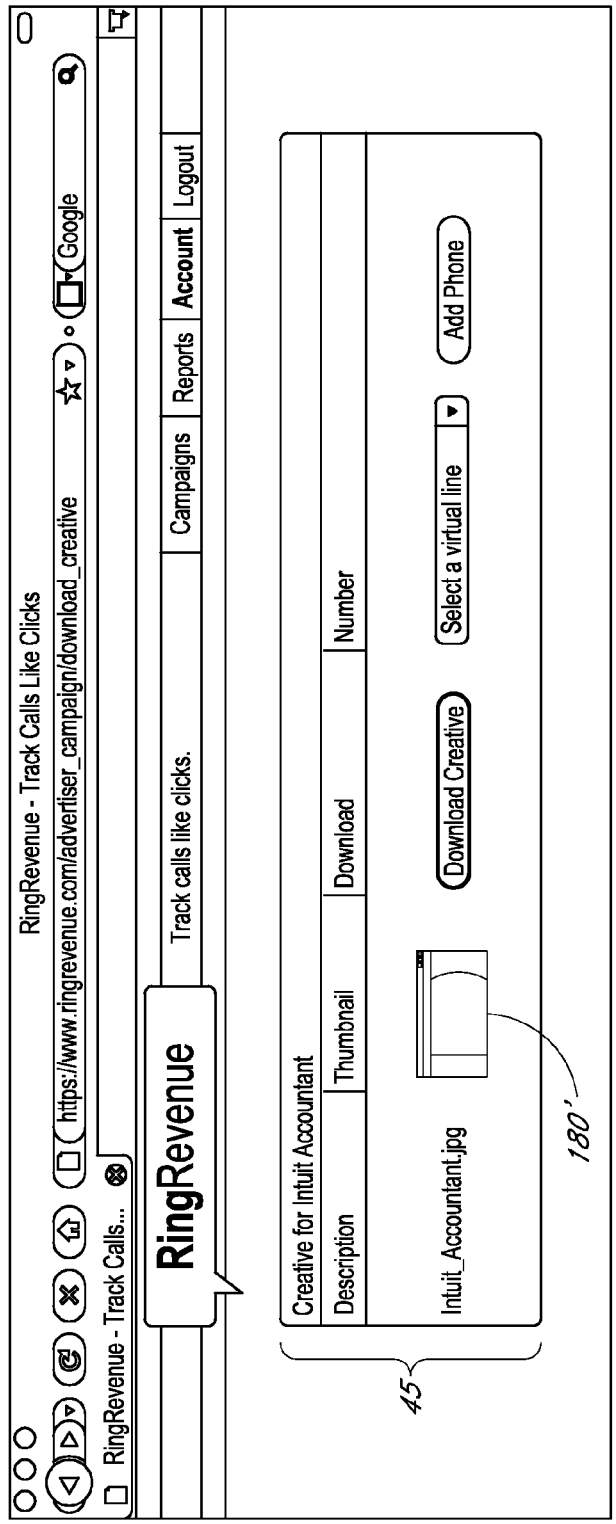
FIG. 25: is an illustration of an example embodiment which illustrates the creative modification submodule.

When the affiliate logs in via system 200, the home screen 200' is presented to the affiliate, an example of which is illustrated in FIG. 21. Here, the affiliate can view pending campaigns, search for new campaigns, view commissions earned, join or link accounts, etc. Submodules may be available to the affiliate 200 through the affiliate function 200', such as the number creation submodule 44, the creative modification submodule 45, the reports submodule 46, and the link customization module, FIG. 25.

Figure 24:
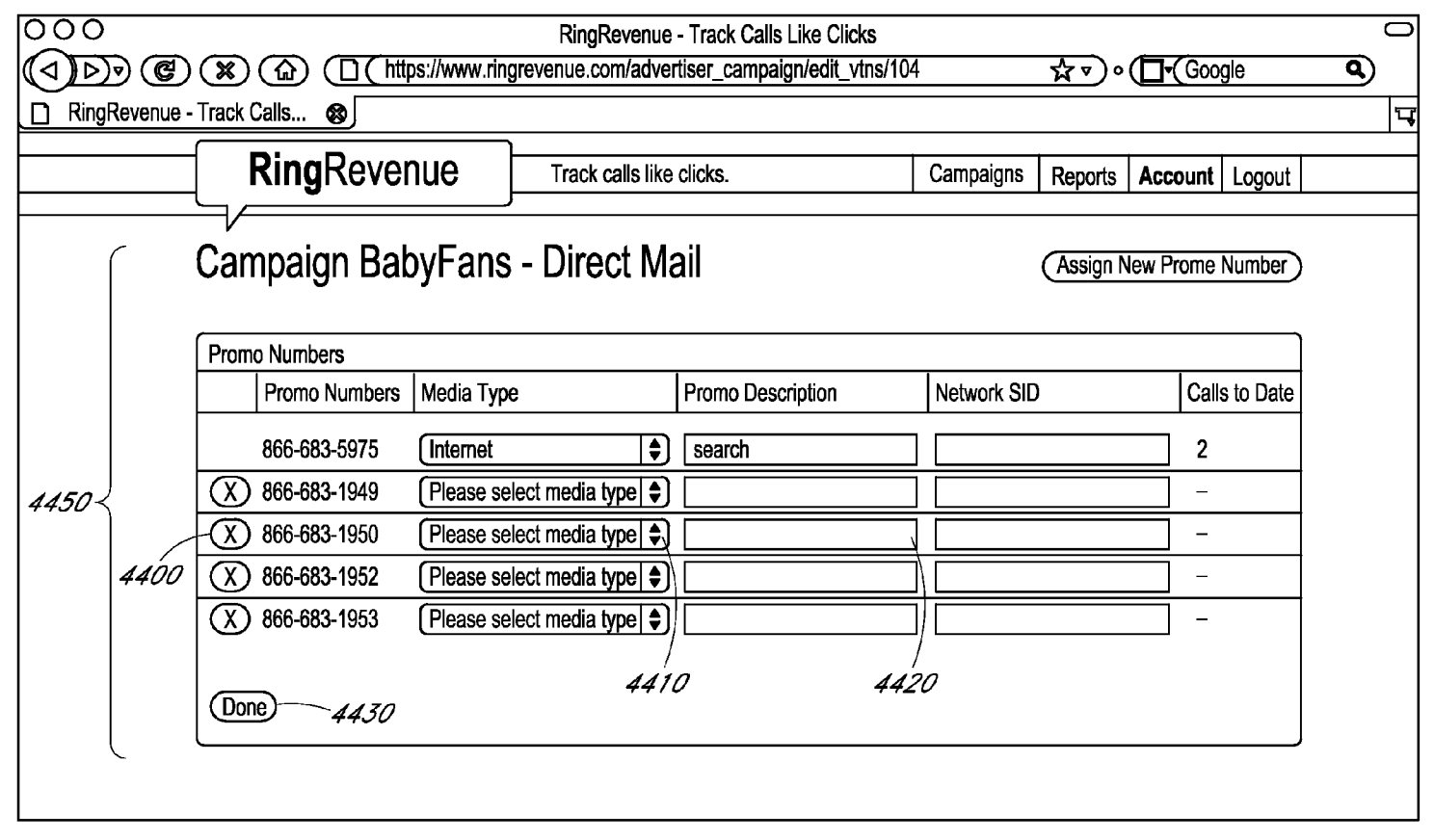

Clicking on the number creation submodule 44 allows the affiliate 200 to assign a promotional phone number so that the affiliate network 100 or the control center 20 routes calls to a promotional phone number to the destination phone number 141 of the advertiser 300. In the embodiment shown in FIG. 24, the affiliate may set the type of advertisement (business publication, direct mail, free standing insert, magazine, radio, television, internet, bulletin board, etc), a description of the promotion, and a network SID (security identifier.) In some embodiments, the affiliate can assign multiple numbers to one campaign in order to determine efficacy of the promotional materials.

Clicking on the creative modification submodule 45 allows the affiliate to add a promotion phone number, email address, or other contact information to the creative 180'. In the embodiment shown in FIG. 25, the creative modification submodule allows the affiliate 200 to embed a particular promotional number into creative 180'.

Figure 26:
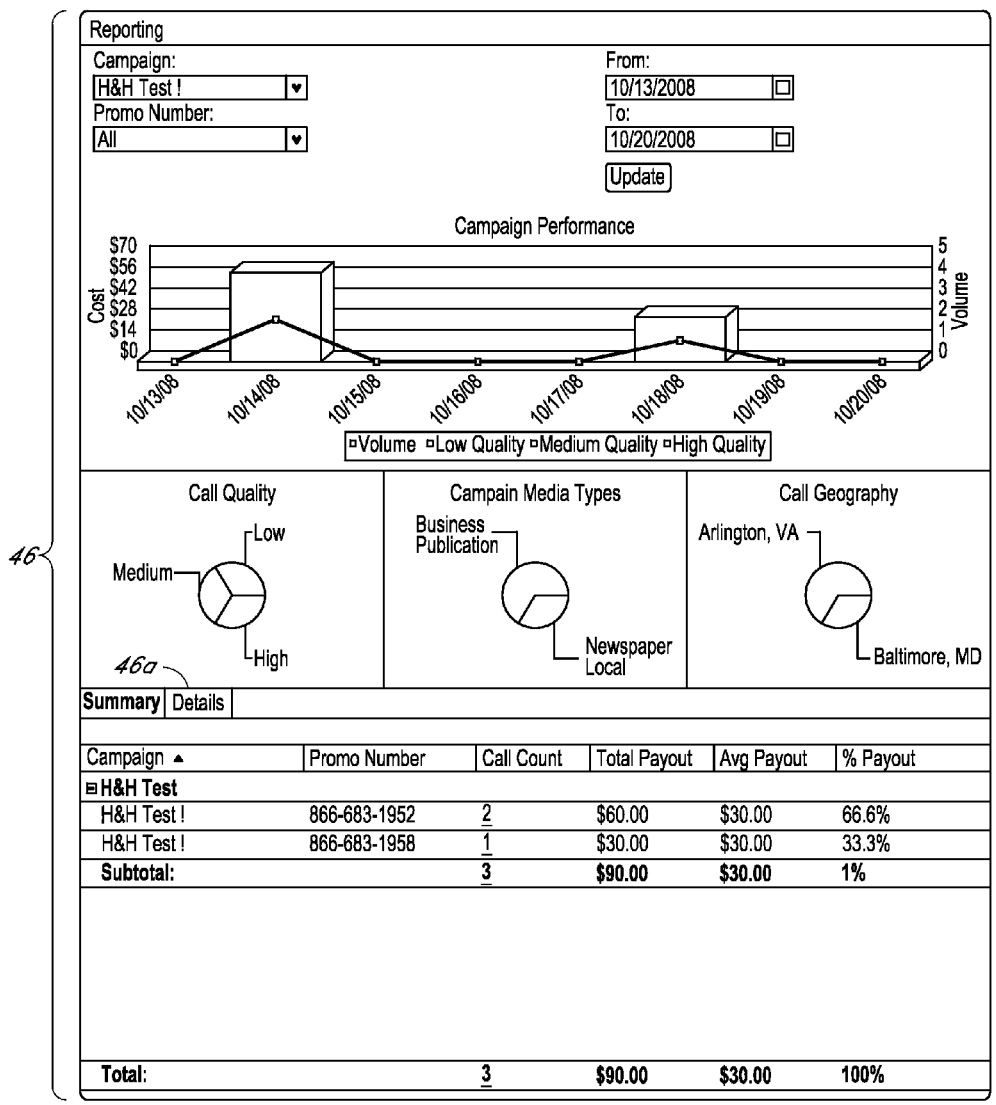
FIG. 26: is an illustration of an example embodiment for viewing report information of the affiliate.
Figure 27:
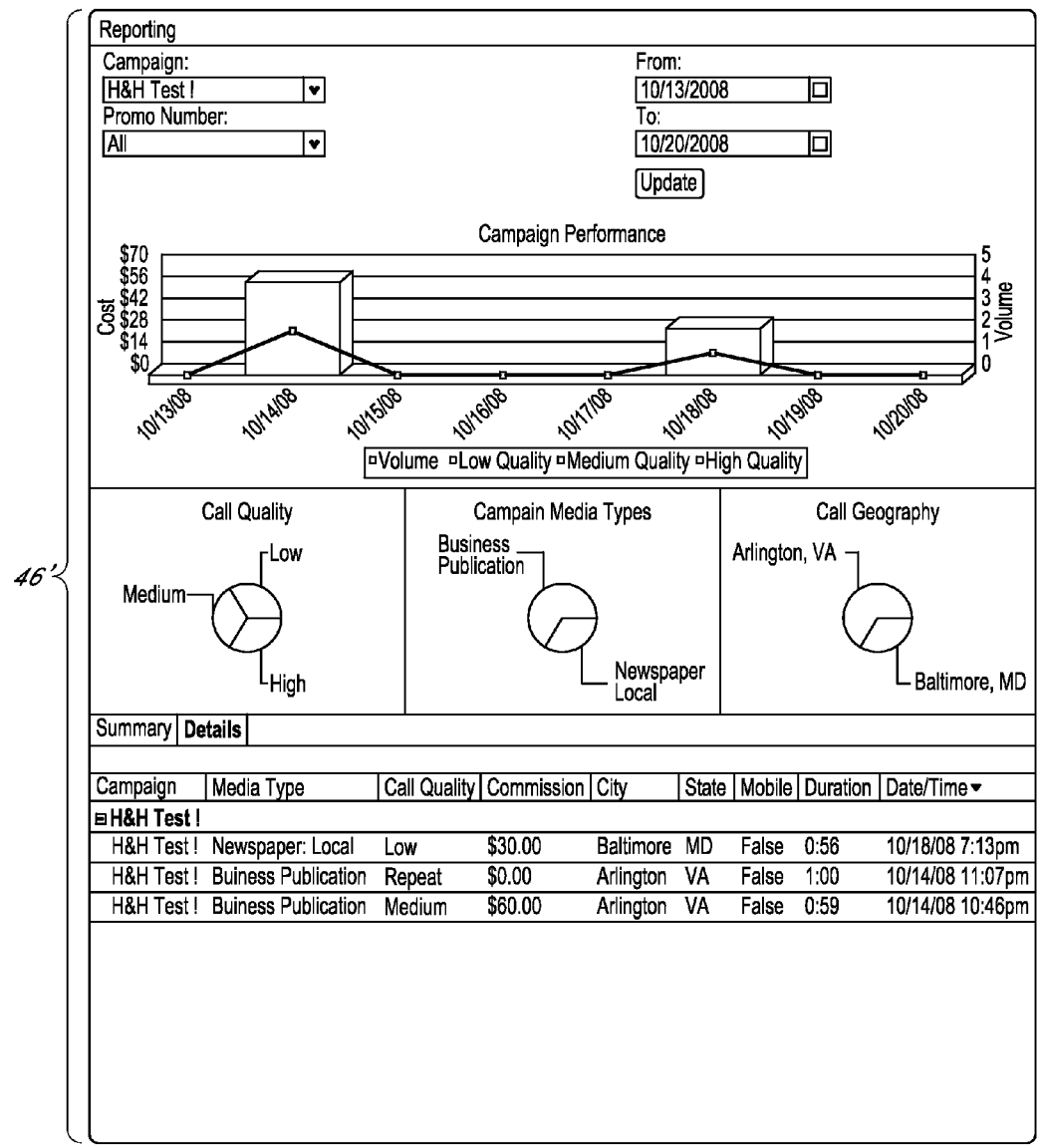
FIG. 27: is an illustration of an example embodiment for viewing alternate report information of the affiliate.

The reporting submodule 46 is illustrated in FIG. 26. Clicking on the details button 46a causes the detailed record submodule 46' to be displayed, FIG. 27.

The link customization module may be used by the affiliate 200 to specify the information contained in the affiliate information object. In some embodiments, the affiliate information object may contain information such as the affiliate's name, ID, the campaign name & ID, the address of the webpage hosting the creative, link, or URL, time & date, promotional phone number, promotional email address, promotional mailing address, and the IP address of the customer 400. The affiliate information object may be used by the advertiser 300 for modifying the displayed contact information on the advertiser's website 302. THE CUSTOMER EXPERIENCE section below provides still additional details.

Affiliate Network Function

The affiliate network function 100' may allow an affiliate network 100 to view and or modify the agreements and campaigns of the advertisers 300 and affiliates 200, see, by way of illustration, the user interface in FIG. 28. For example an affiliate network 100 may have the ability to create or modify a campaign for an advertiser 300. Also, an affiliate network may also be able to apply to campaigns on behalf of an affiliate or setup promotional phone numbers for example. In other cases, an affiliate network 100 may apply and accept the campaigns it creates. In some embodiments of the present invention, the affiliate network participants may have some, all or most of the rights and privileges as both the advertisers and affiliates. When the affiliate network 100 logs in, it is presented with the home screen 100', FIG. 28. The home screen 100' may allow the affiliate network 100 to monitor or modify any of the campaigns and agreements of its affiliates 200 or advertisers 300 by clicking on a particular advertiser 54 or affiliate 55. The affiliate network 100 may also have the ability to use a campaign visibility module 56'. This module 56' may allow the affiliate network 100 to view and or modify the visibility of an advertiser's campaign so that only certain affiliates 200 can view the campaign 24, FIG. 29. Clicking on the affiliate link 25, brings up the change affiliates submodule 26, FIG. 30, which allows the affiliate network 100 to change which affiliates can view the campaign. An advertiser can also view its own campaign visibility module, FIG. 31.

The Campaign Approval and Visibility Process

In an embodiment of the present invention, advertisers 300 can create an advertising campaign 24 using the add new campaign module 23, FIG. 5. Once created, the advertiser 300 may have the option to select which affiliates 200 will be able to view the campaigns 24, FIG. 30. Clicking on the view affiliates hyperlink or button 1125, see FIG. 31, allows the advertiser 300 to change which affiliates 200 can view which campaign. Advertisers may restrict campaign visibility in order to offer certain affiliates 200 special pricing because of the quality or uniqueness of their services. Additionally, advertisers might not want to publish that they pay higher rates to certain affiliates 200, and the change affiliates submodule 26, (see for example, FIG. 30) enables the advertiser 300 to select which affiliates 200 can view their campaigns 24.

Once the campaign 24 is created and the visibility is set, the affiliate, via system 200, may browse and apply to the campaign by selecting a campaign in the campaign application module 47, see FIG. 21. Clicking on one of the campaigns 48 in the campaign application module 47, brings up the affiliate campaign viewing module 48a of FIG. 22. From the affiliate campaign viewing module 48a the affiliate can view various types of information relating to the campaign such as campaign overview, call quality and target profile, campaign pricing, campaign creative, and application terms. In the embodiment shown in FIG. 22, the affiliate can click on the check box 48b and click the agree button 48c to apply to the campaign.

Figure 23:
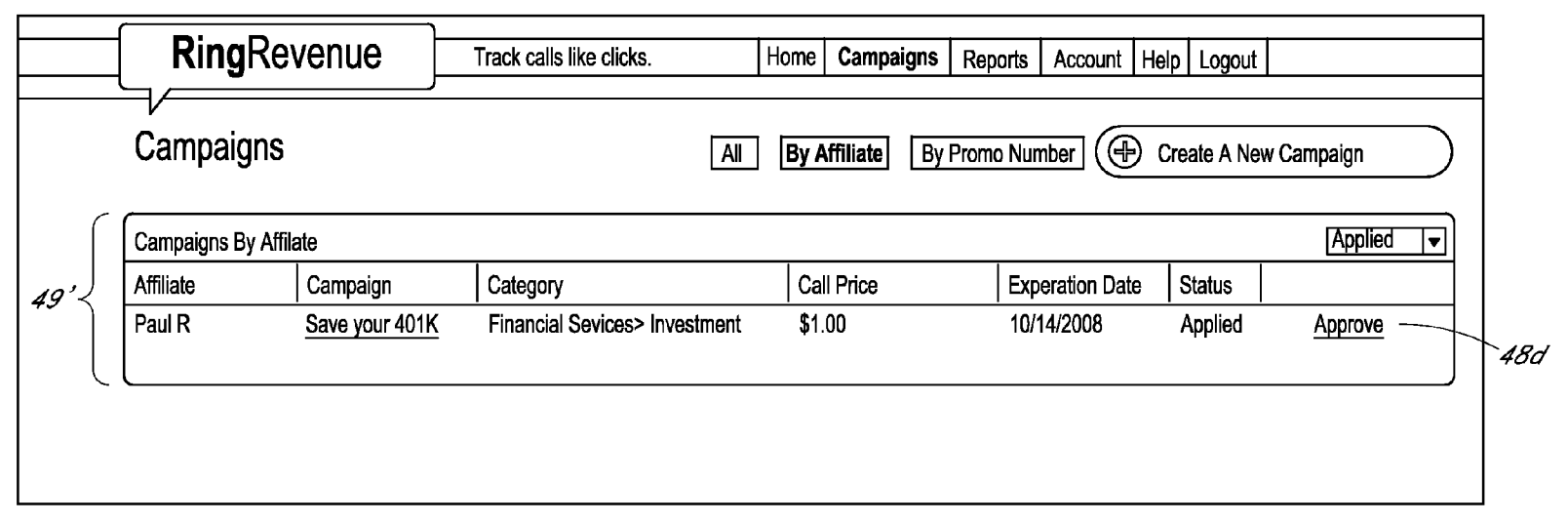

Once the affiliate clicks the agree button 48c, the advertiser 300 will be notified that an affiliate 200 has applied to the campaign 24 via the notification module 31. To accept or reject the application, the advertiser 300 can click on the application notice 35, see for example FIG. 4. Clicking on the notice 35 causes the server of the affiliate network system 100 or the control center 20, to initiate the acceptance module 49', FIG. 23. Through the acceptance module 49', the advertiser can choose to accept or deny the affiliate's application to the campaign 24.

The Customer Experience

In some embodiments of the present invention, an emphasis may be placed on ensuring that customer/consumer 400 (the potential buyer of the advertiser's goods or services) does not need to be at all aware of the entire software platform 10 used to reward the affiliate who brought the customer 400 to the advertiser's corporate website 302. There are several ways an affiliate 200 may induce a customer 300 to visit an advertiser's website 302. In some embodiments, an affiliate might broadcast an email or SMS, place an outbound call, or publish a website, magazine, or newspaper whose subject matter interests the reader. Magazines, newspapers, flyers, or television commercials might list the promotional phone number or email address of the advertiser in the advertisement. Affiliates might provide click through advertisements which also include a copy of the promotional phone number or email address on the advertisement. URL, links, or creatives 180' may also be placed on these websites and publications to an advertiser's website. A URL is the complete or incomplete website listing, such as http://www.retailer.com. Links can be hypertext or pictures which, when clicked, send a command to the customer's web browser to change the current page the customer's web browser is viewing. Creatives 180', made through the creative module 180, are pictures or images that the advertiser 300 would like the affiliate 200 to use in marketing its products or services. In some embodiments, the affiliate can link the promotional phone number with the creative 180', by using the creative modification submodule 45, see FIG. 25. The promotional phone number may be linked by embedding the number into the meta data or filename of the creative 180', physically editing the image of the creative 180' to display the promotional phone number, or appending the promotional phone number to the top, side, or bottom of the creative 180'. Either the customer dials the promotional phone number from the creative 180', or clicks on the URL, link, or creative which causes the customer's web browser to display the advertiser's website 302 or initiate a call to a promotional number.

Ordinarily, when the customer's web browser switches to the advertiser's website, the advertiser's contact information is displayed prominently on the website 302, so that if the customer decides to call the advertiser instead of buying online, the referral by the affiliate 200 is lost. To overcome this problem, an embodiment may be designed so that the link, URL, or creative passes an affiliate information object to the advertiser's website 302. This affiliate information object may contain a variety of information which can be customized though the link customization submodule described above. When this type of information is passed to the advertiser's website 302, the advertiser's website can determine which affiliate 200 caused the customer 400 to visit the advertiser's website 302. The advertiser's website then executes a contact information modulation routine (optionally downloaded from the system) which causes the website to display the promotional phone number selected by the affiliate 200. Thus, if the customer 400 calls the promotional phone number listed on the advertiser's website the number is routed through an affiliate network 100 or control center 20 and the affiliate 200 is given proper credit for the referral. The contact information modulation routine may be embodied as a software package (optionally downloaded from the system) that causes the contact information on the advertiser's webpage to change from their default values to a value specified by the affiliate information object.

In some embodiments of the present invention, the contact information modulation routine may also validate the affiliate's 200 account information with the affiliate network 100 or the control center 20. Advertisers may wish to validate the affiliate's account before paying commissions to make sure the campaign is still active and that affiliate is authorized to charge the advertiser 300 for referrals.

Operating Environment and Process Flow

Figure 32:
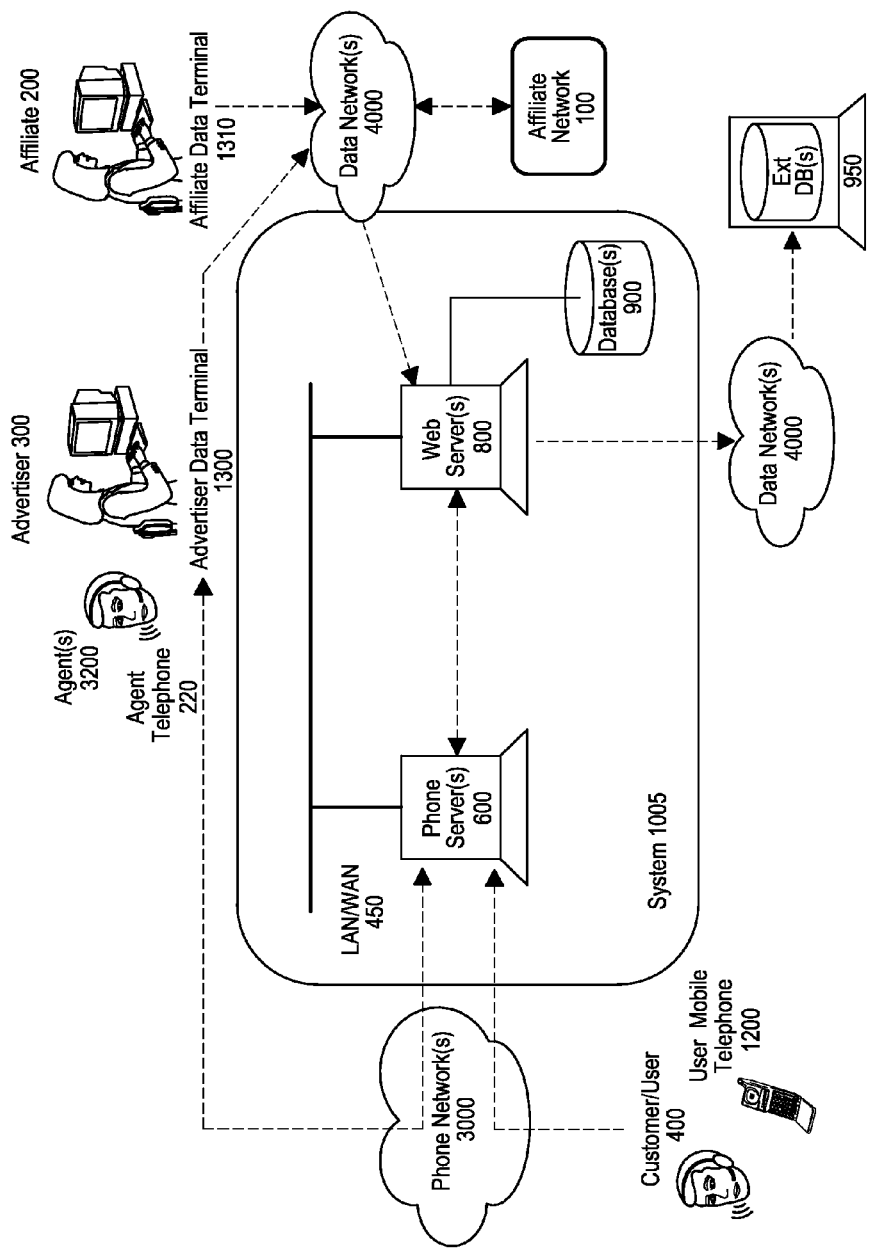
FIG. 32: illustrates an example network operating environment for a network advertising and call bridging communications system.

FIG. 32 illustrates an example Affiliate Network Call Bridging System (ANCB system) 1005. As illustrated, the ANCB system is connected or connectable to a plurality of consumers/customers/users 400 and the user's mobile phones 1200. The mobile phones 1200 are connected to a phone (wireless) network 3000 and data network 4000. Optionally, wireline phones (not shown in FIG. 32) are connected to a phone (wireline) network 3000. Optionally, the ANCB system includes the Affiliate Network 100 and Control Center 20, see, for example, FIG. 1.

As further illustrated, the ANCB system 1005 interacts with a plurality of advertiser and affiliate computer/data terminals 1300 and 1310, respectively. The data/computer terminals 1300 and 1310 can be a personal computer having a monitor, keyboard, memory, and a data communication interface. In addition, the computer terminal 1300 and 1310 can be an interactive television, a networked-enabled personal digital assistant (PDA) or the like. The data/computer terminals 1300 and 1310 are connected to a data network 4000 (e.g., the Internet or a corporate LAN or WAN). The data network 4000 includes wireline data networks (like the public Internet accessed using dialup or DSL/cable modems) and wireless data networks (e.g., wireless mobile and WiFi data networks).

As further illustrated, the ANCB system 1005 integrates with a plurality of customer service and/or sales agents 200 via the phone network 3000 and data network 4000. Optionally, the agents 3200 have a wireline/wireless phone and/or a phone headset 220 used to communicate with customer's/user's 400.

The ANCB system's 1005 servers 600 and 800 are interconnected either through Data Network 4000 or via a private Local Area Network (LAN) or private Wide Area Network (WAN) 450—as shown by the solid line connections in FIG. 32.

The ANCB system 1005 in this example contains centralized databases 900 and/or general-purpose storage area, optionally including, but not limited to, some or all of the following: an advertiser, affiliate, affiliate network account database, configured campaigns and campaign attributes, phone numbers/addresses, call routing rules, call records, call recordings, advertising creatives, etc.

The ANCB system 1005 in this example can optionally access external databases 950 through the data network 4000. For example, the ANCB optionally queries external databases to collect additional information about a caller using the caller's phone address.

The ANCB system 1005 in this example contains a phone server subsystem 600 with call processing and call bridging capabilities. Optionally, the servers bridge calls between users, advertisers (e.g., advertiser's call center), and/or third parties (e.g., an outsourced call center). User calls optionally are received by (inbound) or originated from (outbound) the phone server subsystem 600. Additionally, advertiser/third party calls are received by (inbound) or originated from (outbound) the phone server subsystem 600. For example, a call center agent places a call to the phone server subsystem 600 and the phone server subsystem originates an outbound call to a user who expressed an interest in a product or service, or in response to a gesture on a web-page (e.g., click-to-call). These servers 600 optionally provide interactive voice response, voice messaging, voice recognition, text-to-speech services and voice message transcription to natural-language text. Optionally, the phone server's services (e.g., text-to-speech) utilized in a call are configurable (e.g., a specific interactive voice response tree or sub-menu) and may be determined based on attributes of the caller or called party or other call quality criteria (e.g., time-of-day, terminal device of caller or called party, etc.).

The ANCB system 1005 in this example contains a web server and general purpose server subsystem 800 with web serving and general computing capabilities.

In this example, the ANCB system 1005 servers 600 and 800 are optionally centralized at a given location, or distributed to a number of locations. The ANCB system 1005 can be implemented as a standalone system (e.g., an ANCB system used by a number of service providers) or the ANCB system can be integrated into a service provider's internal systems (e.g., an affiliate network). Optionally, the ANCB system 1005 is connected to a data communication network 4000 and a wireline/wireless network 3000. The ANCB system 1005 interconnects with the wireline/wireless network 3000 using telecommunication interfaces (e.g., SS7) and via data communication networks 4000 using a secure router subsystem and an SMS server subsystem which optionally serves as a mail relay to transmit and receive SMS and MMS messages via a Short Message Service Center (e.g., an SMSC operated by a network carrier).

Example Embodiments of Workflows

FIGS. 33 through 38 illustrate example workflows of operation of the example ANCB system 1005 discussed above. Process states are listed on the left and elements of the operating environment of FIG. 32 are listed across the top.

FIGS. 33-38 depicts an example embodiment of the system where a producer of baby fans, the advertiser 300, enlists an affiliate 200 to promote their fans to consumers 400. The embodiment below describes how the producer/advertiser 300 creates a campaign and makes the campaign available to an affiliate 200. The affiliate then assigns a phone number to the campaign and integrates the phone number into the affiliate's web site. A user/consumer 400 then places a call to the phone number and is connected to the baby fan manufacturer's call center. The call is tracked by the call bridging system and the affiliate 200 is credited for the call.

In the example embodiment below, the advertiser 300 previously registered and created an account in the affiliate network system database 900. In addition, the affiliate 200 created an account in the affiliate network system database 900.

Figure 33:
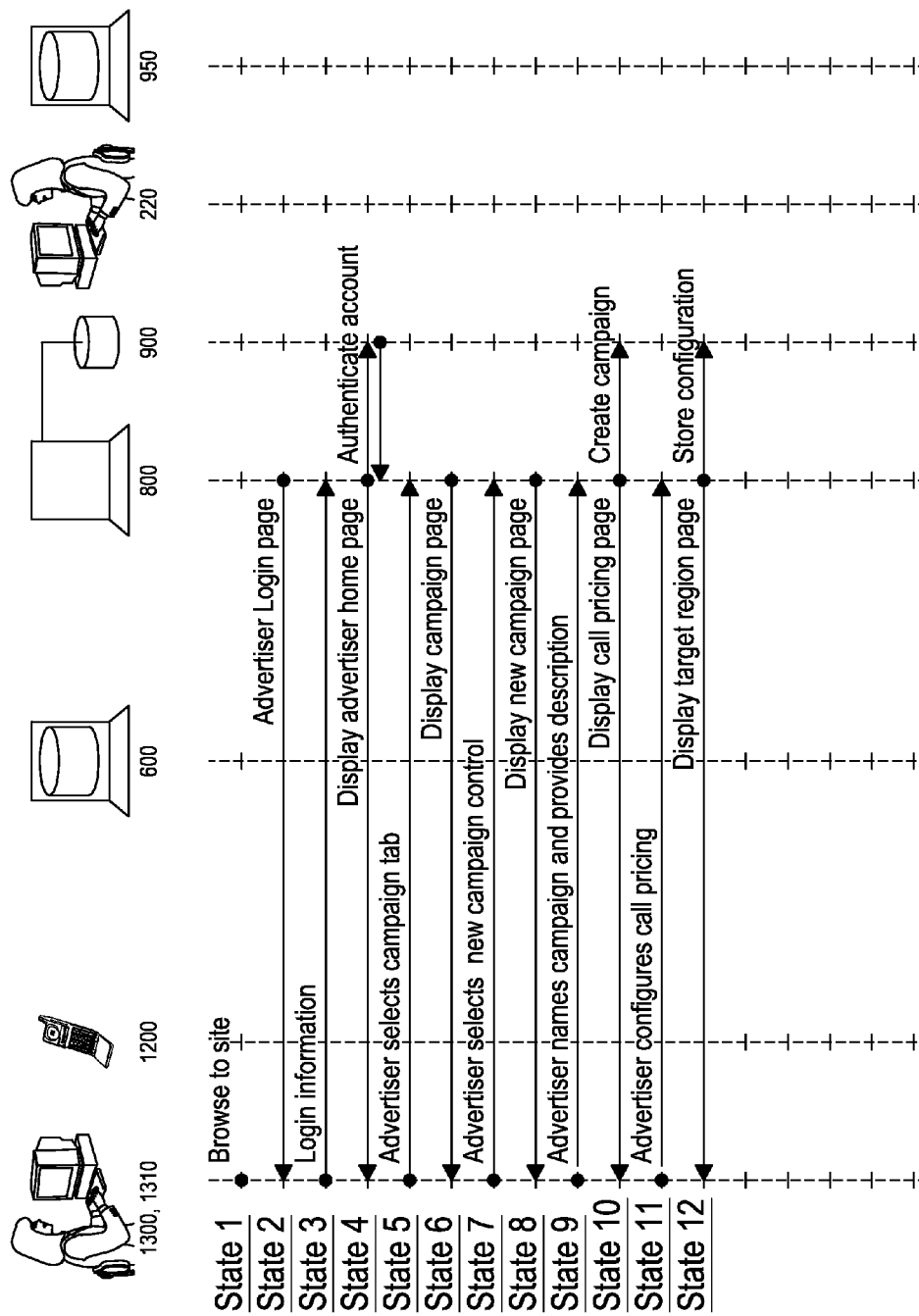
FIGS. 33-38: illustrate an example operating environment/process for a communications system

State 1 of FIG. 33 An advertiser 300, the producer of baby fans in this example, accesses the Affiliate Network (AN) 100 web site/system 1005. In this example, the advertiser browses to the ANCB 100 web site/system 1005 using a PC 1300 connected to data network 4000. Optionally, any data networking capable device can be used by advertiser 300 including for example, a mobile phone 1200 with data networking capabilities.

State 2. The ANCB web hosting server 800 receives the web page URL request and presents an advertiser login/registration web page, see FIG. 9, to the advertiser 300.

State 3. The advertiser 300 fills in their email address (or user ID) in the email address field 1000 and password in the password field 1001 in the web form FIG. 9 and clicks a Submit control 1002.

State 4. The server 800 receives the login requests. The account information entered by the advertiser 300 is authenticated against registered accounts in the database 900. In this example, the account information is valid and the server 800 responds by logging the advertiser 300 into their account and displaying the advertiser home page, see FIG. 4 for an example advertiser home page.

State 5. The advertiser 300 creates a campaign for Baby Fans. The advertiser 300 creates a new campaign by first selecting the campaign tab control 37 in FIG. 4.

State 6. The server 800 receives the advertiser's request. The server 800 responds by displaying the Campaigns web page, see FIG. 5.

State 7. The advertiser 300 selects the new campaign control 23 in FIG. 5.

State 8. The server 800 receives the advertiser's 300 request and the server 800 responds by displaying the New Campaign web page, see FIG. 10.

State 9. The advertiser 300 enters a campaign name, "Baby Fan Sale", in field 111 and a campaign description, in field 114 of FIG. 10. The advertiser 300 optionally selects a product or service category "Family>Babies" using the pull down menu control 113. The advertiser 300 optionally selects the "ongoing" campaign control 115. In this example, the advertiser 300 did not select a Network AID 112 or enter a Campaign description 114. The advertiser 300 selects the Next control 116, see FIG. 10.

State 10. The server 800 receives the advertiser's request to create a campaign. Optionally, the server 800 ensures the campaign name is unique for the advertiser 300 and then creates a new campaign named "Baby Fan Sale" and stores the entered/selected campaign information in the database 900. The server 800 next responds by displaying the Call Pricing web page, FIG. 11.

State 11. From the call pricing web page the advertiser 300 specifies optionally whether calls are to be managed in a fixed price scheme or to depend upon call quality. In this embodiment, the advertiser 300 selects a fixed price per call of $5 for high quality calls 136 and $1 for low quality calls 138 of FIG. 11. The advertiser 300 optionally selects the $0.00 price for repeat callers control 11000. The advertiser 300 then selects the Next control 11100.

State 12. The server 800 receives the advertiser's 300 campaign configuration data. Optionally, the server 800 stores the entered/selected campaign information in the database 900. The server 800 next responds by displaying the Target Regions web page, FIG. 13.

Figure 34:
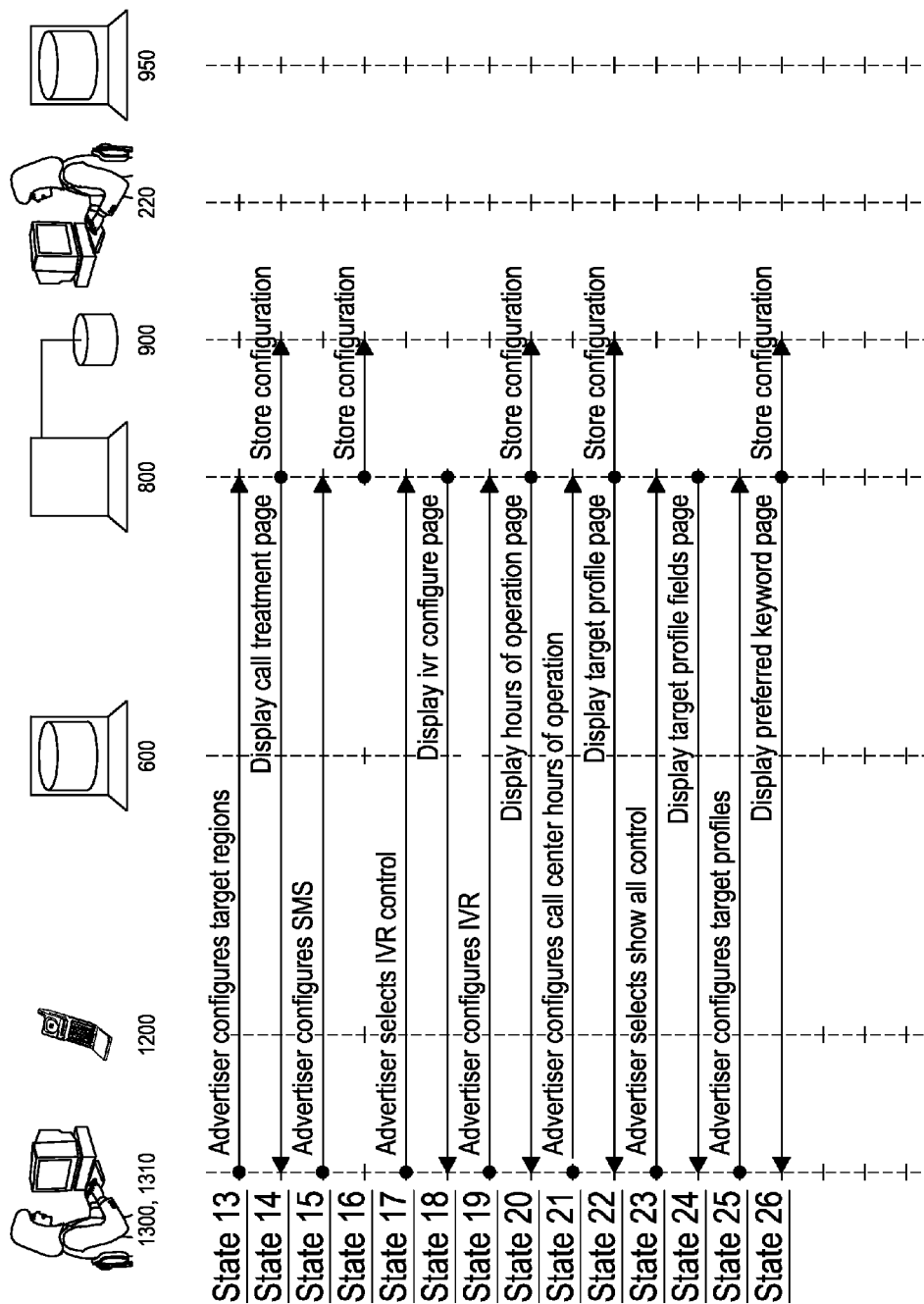

State 13 of FIG. 34. In this example, the advertiser 300 chooses not to designate a different call quality based upon the region a call is originating from. The advertiser 300 selects the All U.S. control 13000 and then selects the Next control 13100, see FIG. 13.

State 14. The server 800 receives the advertiser's 300 campaign configuration data. Optionally, the server 800 stores the entered/selected campaign information in the database 900. The server 800 next responds by displaying the Call Treatment web page, FIG. 14.

State 15. In this example, the advertiser 300 configures two separate call treatments: a text message to be sent to caller's mobile phone after their call; and an Interactive Voice Response (IVR) tree for incoming calls.

Figure 14:
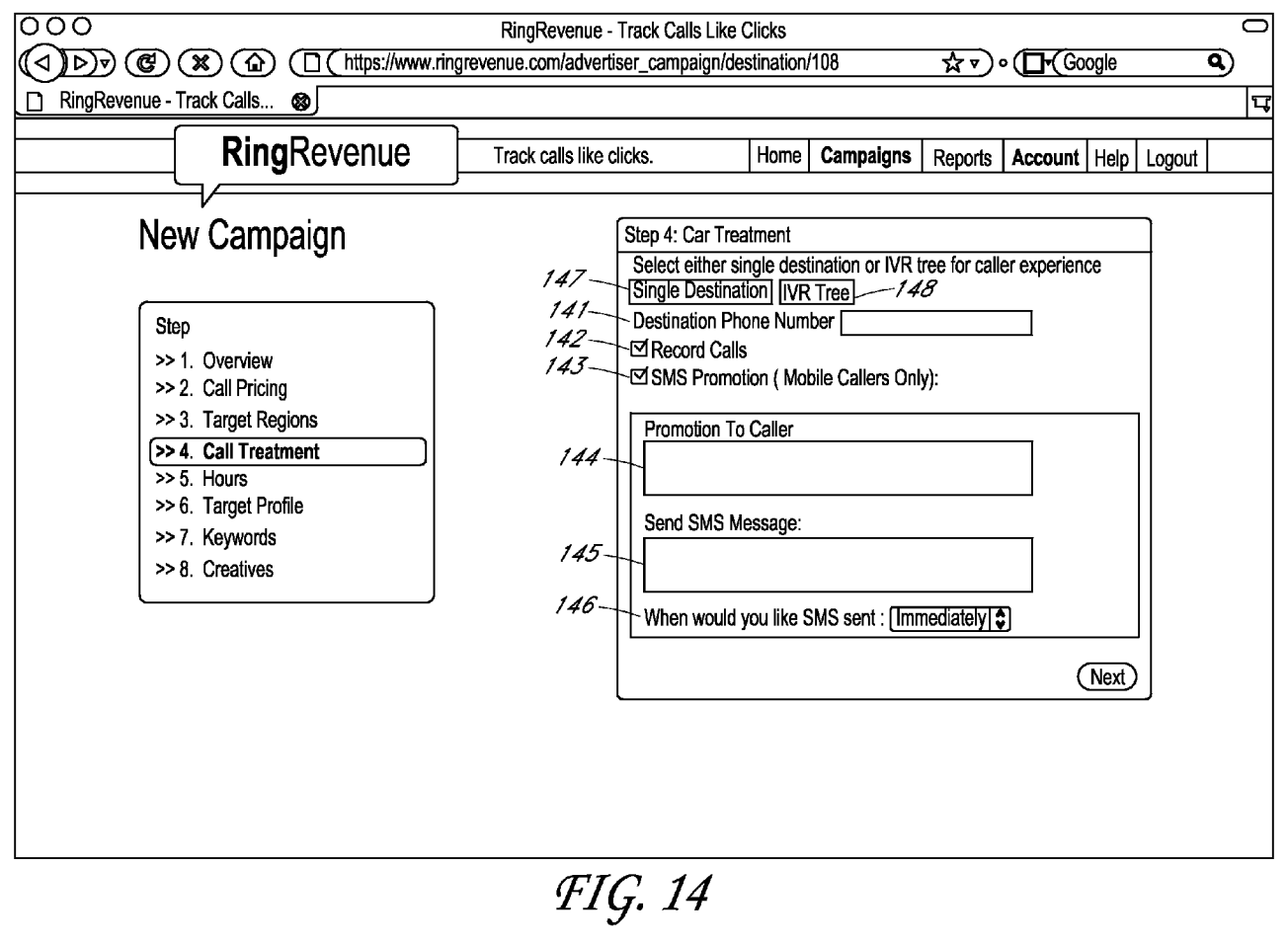

To configure text messaging, the advertiser 300 enters the text "Thank you for your interest in baby fans, if you have any further questions please call 800-800-0000 or visit our web site www.acmebabyfans.com" in field 145 and selects the Immediately control from the pull down menu 146, see FIG. 14.

State 16. The server 800 receives the advertiser's campaign configuration data. Optionally, the server 800 stores the entered/selected campaign information in the database 900.

State 17. The advertiser 300 next configures the system to distinguish callers interested in infant baby fans from toddler baby fans. Depending upon the caller's interest, calls are bridged to two different call centers in Phoenix, Ariz.

The advertiser 300 selects the Interactive Voice Response (IVR) Tree control 148, see FIG. 14.

State 18. The server 800 receives the advertiser's request. The server 800 responds by displaying the Call treatment IVR configuration web page, see FIG. 15.

State 19. The advertiser 300 selects "Menu" in the pull down menu control 149*f*, see FIG. 15; enters the text "You have reached ACME baby fans. If you are interested in infant baby fans, press or say one. If you are interested in toddler baby fans, press or say two." in the text field 149*a*, see FIG. 15; selects the direct connect configuration response option in the pull down menu control 149*b* if the user keypresses or speaks "one", see FIG. 15; enters the text "Now connecting to an agent handling infant baby fans, please hold." in the text field 149*g* which is configured to be played after the caller keypresses the dual tone multi-frequency (DTMF) control one or speaks "one"; enters the destination phone number of the Phoenix call center, infant baby fans department 602-555-1234 in the phone number field 149*c*, see FIG. 15; selects the direct connect response option in the pull down menu control 149*h* if the user keypresses the dtmf two or speaks "two", see FIG. 15; enters the text "Now connecting to an agent handling toddler baby fans, please hold." in the text field 149*i* which is configured to be played after the caller keypresses the dtmf control two or speaks "two", see FIG. 15; enters the destination phone number of the Phoenix call center, toddler baby fans department 602-666-1234 in the phone number field 149*k*. The advertiser 300 then selects the Done control 149*j*.

State 20. The server 800 receives the advertiser's 300 IVR configuration data. Optionally, the server 800 stores the entered/selected IVR configuration in the database 900. The server 800 next responds by displaying the Hours of Operation web page, FIG. 16.

State 21. The advertiser's 300 call center is open Monday through Friday, 8:00 AM to 5:00 PM, Pacific Standard Time, and closed on the weekends. The advertiser 300 selects the closed Sunday check box control 1600 and closed Saturday check box control 1610 to signify the call center is closed on Sunday and Saturday, see FIG. 16. The advertiser 300 does not change the default open and close hours fields. The advertiser 300 also selects Mountain Standard time in the time zone scroll control 1620, see FIG. 16. The advertiser 300 then selects the Next control 1630.

State 22. The server 800 receives the advertiser's 300 call center hours of operation configuration data. Optionally, the server 800 stores the entered/selected hours of operation configuration in the database 900. The server 800 next responds by displaying the Target Profile web page, FIG. 17.

State 23. Based on previous market research, the advertiser 300 has determined that if a caller is calling from their cell phone, they are much more likely to purchase baby fans. In this example, the advertiser 300 is willing to pay a premium for these types of calls. The advertiser 300 selects the show all fields control box 161, see FIG. 17.

State 24. The server 800 receives the advertiser's request to show all target profile fields. The server 800 responds by displaying a new web page depicting all of the target profile configurable fields, see FIG. 18.

State 25. The advertiser 300 selects the calling from control box 164 and moves the Mobile slider control 165, see FIG. 18, to High to designate a high premium in this campaign for inbound cell phone calls. The advertiser 300 then selects the Done control 166 in FIG. 18.

State 26. The server 800 receives the advertiser's 300 target profile configuration data. Optionally, the server 800 stores the entered/selected target profile configuration in the database 900. The server 800 next responds by displaying the Preferred Keywords web page, FIG. 19.

Figure 35:
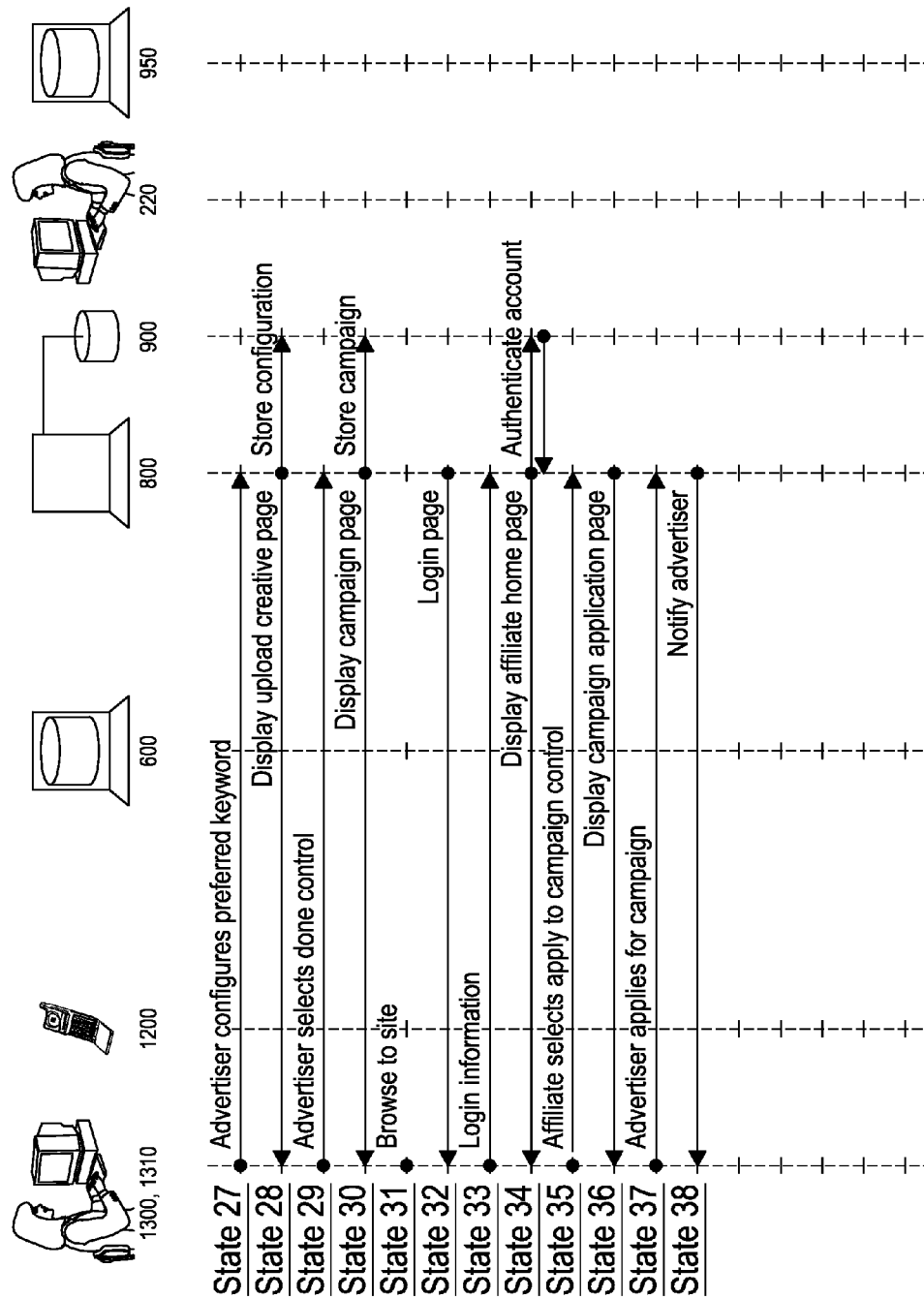

State 27 of FIG. 35. The advertiser 300 has determined that if a caller speaks the keyword "friend" they have a higher probability of purchasing a baby fan. For example, a caller may mention they heard about baby fans on sale from a friend. The advertiser 300 identifies the keyword for the campaign by typing in the word "friend" in the field 170 of FIG. 19. The advertiser 300 then selects the Next control 171.

State 28. The server 800 receives the advertiser's 300 preferred keyword configuration data. Optionally, the server 800 stores the entered/selected preferred keyword configuration in the database 900. The server 800 next responds by displaying the Upload Creative web page, FIG. 20.

State 29. In this example embodiment, the advertiser 300 chooses not to upload any creatives such as a banner ad for use by the affiliate. The advertiser 300 selects the Done control 181 in FIG. 20.

State 30. The server 800 receives the request and optionally updates the database to reflect the advertiser 300 has not selected to upload creative for the campaign and that the campaign is now created. With the campaign created, the server 800 displays the Campaign home web page, see FIG. 5. The newly created campaign is displayed in the campaign summary and is available to one or more affiliates.

Optionally, the server 800 displays a web page similar to that shown in FIG. 30 which allows the advertiser to open or restrict access/visibility of the campaign to certain affiliates. In this example embodiment, the advertiser's 300 campaigns are accessible and visible to all affiliates.

State 31. In this example embodiment, an infant newsletter web site, daycaretoday.com, is interested in becoming an affiliate 200 and promoting baby fans. The affiliate 200 registers and becomes a member of the affiliate network 100 (not shown).

The affiliate 200, daycaretoday.com, accesses the affiliate network (AN) web site. In this example, the user browses to the AN web site using a PC 1310 connected to data network 4000.

State 32. The AN web hosting server 800 receives the web page URL request and presents an affiliate login/registration web page to the affiliate 200, see FIG. 9.

State 33. The affiliate 200 enters their email address in the email field 1000 and password in the password field 1001 and selects the submit control 1002, see FIG. 9.

State 34. The server 800 receives the login requests. The account information entered by the affiliate 200 is authenticated against registered accounts in the database. In this example, the account information is valid and the server 800 responds by logging the affiliate 200 into their account and displaying the affiliate home page, see FIG. 21 for an example affiliate home page.

State 35. The affiliate 200 applies to the Baby Fans campaign by selecting the apply control 48, see FIG. 21.

State 36. The server 800 receives the affiliate's 200 application for the Baby Fans campaign request and displays a new campaign affiliate application web page to the affiliate 200; see FIG. 22 for an example campaign affiliate application web page.

State 37. The affiliate 200 reviews information about the campaign 48*a*, including some or all of the campaign information established by the advertiser 300 in the campaign creation steps detailed above. After reviewing the campaign details and terms and conditions, the affiliate selects the terms and condition control 48*b*, and then selects the apply control 48*c*, see FIG. 22.

State 38. The server 800 receives the affiliate application request. The application request triggers a message notification event to be posted to the advertiser 300 from the notification module.

Figure 36:
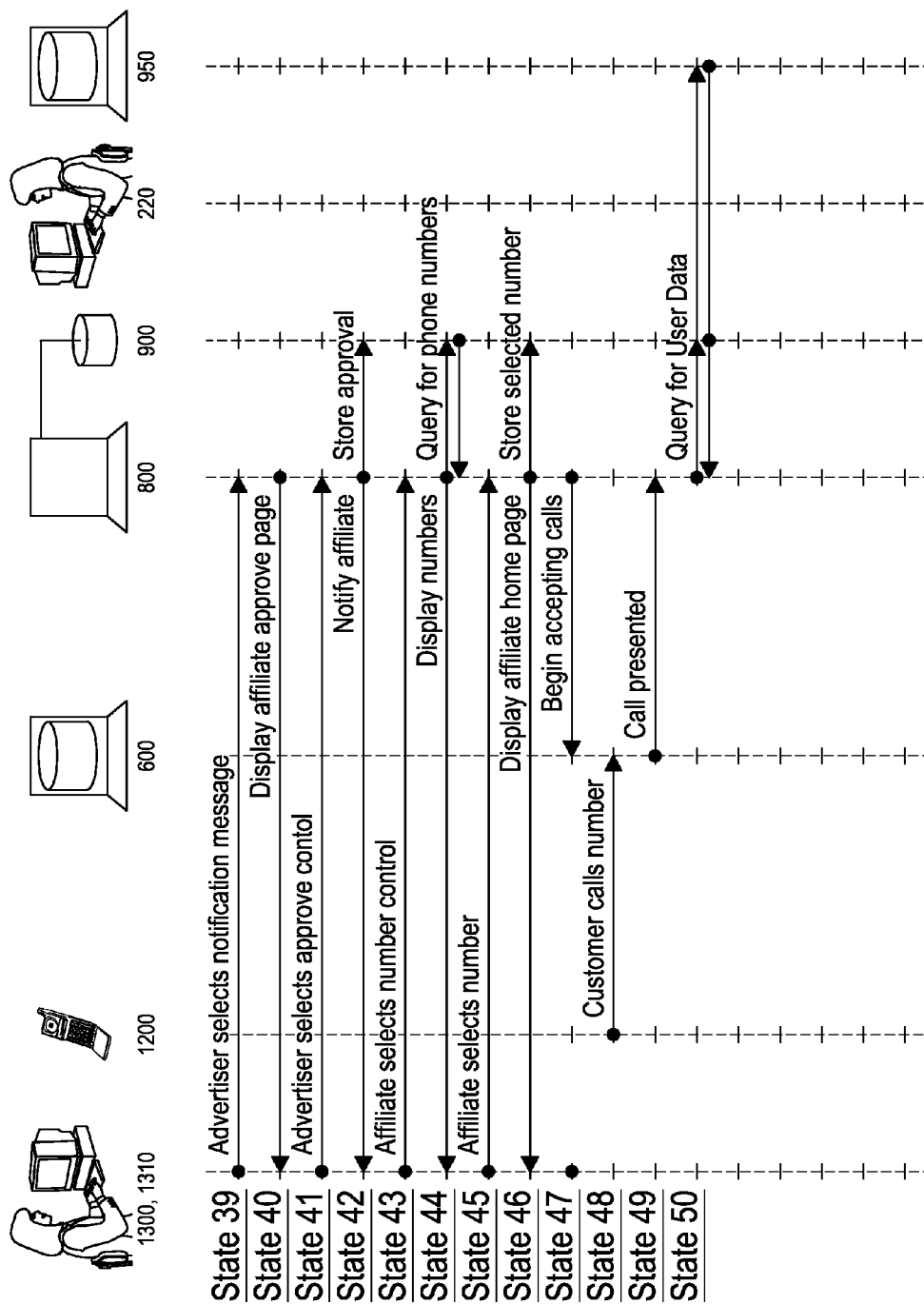

State 39 of FIG. 36. In this example, the advertiser 300 is logged into the server 800 and notices a new notification 35, see FIG. 4. The advertiser 300 selects the notification message which is a link to an affiliate 200 acceptance web page, see FIG. 23.

State 40. The server 800 receives the advertiser 300 selection request and displays to the advertiser an affiliate approval web page, see FIG. 23.

State 41. The advertiser 300 approves the affiliate 200, daycaretoday.com, application by selecting the approve control 48*d*.

State 42. The server 800 receives the approved application request from the advertiser 300. The server 800 updates the database 900 and optionally posts a notification message 41, see FIG. 21, to the affiliate 200 from the notification module.

State 43. In this example, the affiliate 200, daycaretoday.com, is logged in to the server 800. The affiliate 200 reads the approval message 41, see FIG. 21. Additionally, the campaign status displayed to the affiliate 200 is in the approved/active state 43, see FIG. 21.

The affiliate 200 is now ready to manage the campaign by assigning a phone number to the campaign. The assigned phone number will be used by the affiliate 200 in their creatives/advertisements relating to baby fans. The affiliate 200 selects the numbers control 44, see FIG. 21.

State 44. The server 800 receives the affiliate's 200 numbers request control. The server 800 queries the database 900 for one or more configurable number (e.g., 5 numbers) of available phone numbers and displays a new web page listing these numbers and associated fields, see FIG. 24.

State 45. The affiliate 200 selects a phone number, 866-683-1950, by selecting the control 4400 to the left of the displayed phone number, see FIG. 24. The affiliate 200 selects a media type, Internet, from a pull down menu control 4410. Optionally, the affiliate 200 enters a promotional description, baby fans, in the promo description field 4420. After configuring the phone number associated with the campaign, the affiliate 200 selects the Done control 4430, see FIG. 24.

State 46. The server 800 receives the affiliate 200 phone number configuration request. In response, the server 800 updates the database with the number assignment to the affiliate 200 and stores the media type and promotional description. The server 800 then displays the affiliate 200 home page, see FIG. 21.

State 47. The server 800 configures the phone server 600 (telephony call bridge) to begin accepting calls to the phone number 866-683-1950.

The affiliate modifies their Internet promotion (or offline promotion) of baby fans to include the phone number 866-683-1950.

State 48. A reader of the newsletter (a customer 400) who is interested in purchasing a baby fan notices the affiliate's 200 Internet banner advertisement for baby fans. The customer 400 places a phone call from their cell phone 1200 to the number 866-683-1950. The call is routed through the public switched telephone network 3000 to the ANCB platform 100, phone server 600.

State 49. The phone server 600 notifies the server 800 of the presented call along with the call signaling information associated with the call (e.g., calling and called numbers, direct call, etc.).

State 50. The server 800 queries the database 900 to determine the call handling treatment for the call and optionally external databases 950 to collect additional information about the caller 400 (and calling device/type of device) for call rating and tracking purposes. From the calling number the server 800 determines the caller is calling from a cell phone, thus, the call is noted for lead tracking purposes as a premium call.

Figure 37:
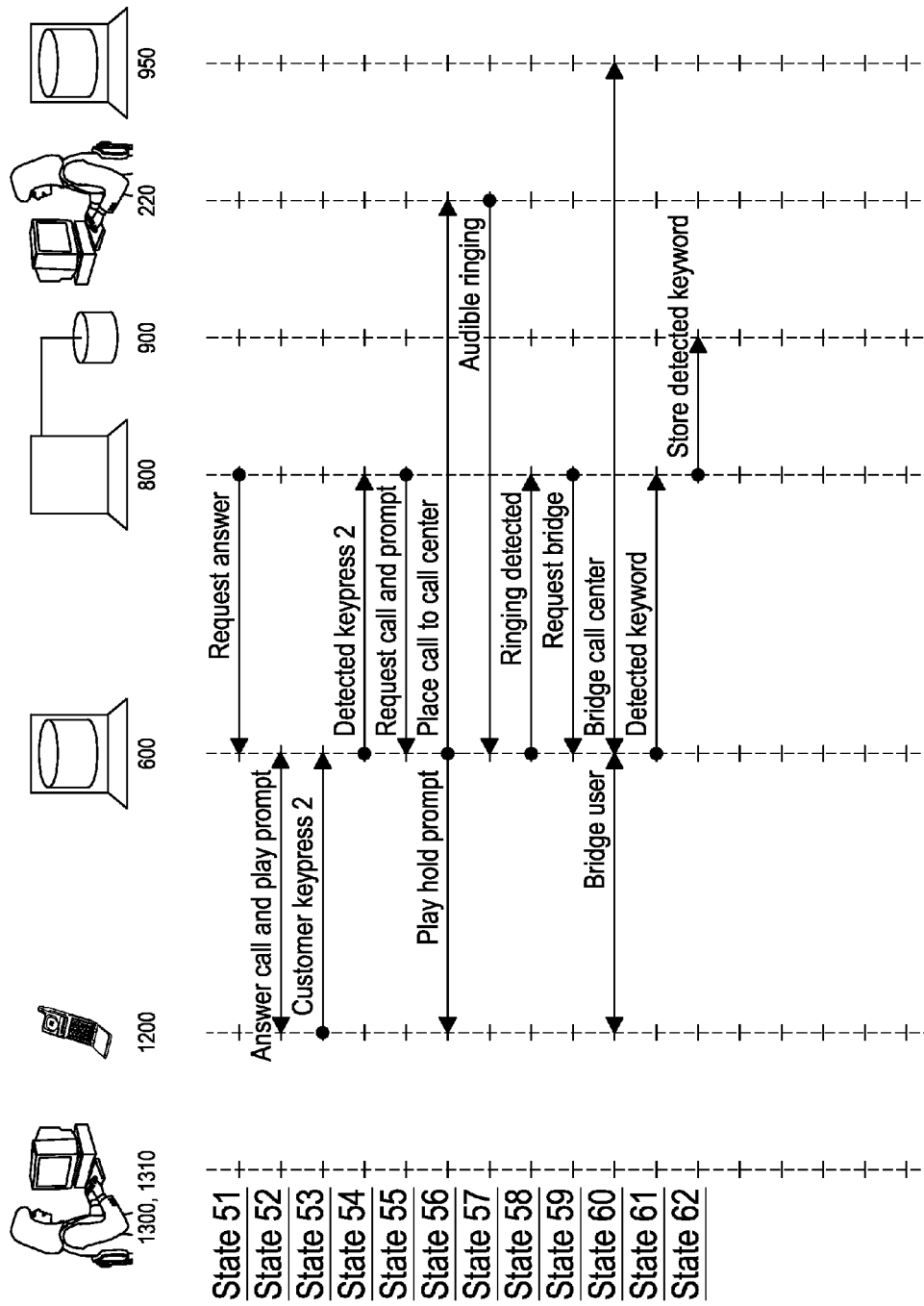

State 51 of FIG. 37. Since the called phone number 866-683-1950 is associated with the baby fans campaign, the call treatment is to initially play an interactive menu to the caller. The server 800 requests the phone server 600 answer the call and play the voice menu configured for this campaign.

State 52. The phone server 600 answers the incoming call and plays the voice prompt to the customer/caller 400 "You have reached ACME baby fans. If you are interested in infant baby fans, press or say one. If you are interested in toddler baby fans, press or say two".

State 53. In this example, the caller presses two on their phone keypad in response to hearing the voice prompt.

State 54. The phone server 600 detects a dual tone multi-frequency tone (dtmf) two. The phone server 600 notifies the server 800 of the dtmf event.

State 55. The server 800 requests the phone server 600 generate an outbound call to the configured phone number/address 602-666-1234 which is the advertiser's 300 destination phone number of the Phoenix call center, toddler baby fans department.

State 56. The phone server 600 generates an outbound call to the phone number/address 602-666-1234.

State 57. The phone server 600 detects audible ringing on the outbound call to the call center.

State 58. The phone server 600 notifies the server 800 of the audible ringing on the outbound call to the call center.

State 59. The server 800 requests the phone server 600 bridge the inbound call from the customer/caller 400 to the outbound call to the call center.

State 60. The phone server 600 bridges the inbound call from the customer/caller 400 to the outbound call to the call center 3200.

Optionally, the phone server 600 continues to monitor both legs of the call. The call center agent asks the caller how the caller heard about ACME baby fans. The caller said they heard about it from a friend and saw the advertisement in a banner advertisement on the daycaretoday.com web site.

State 61. The phone server 600 detects the keyword "friend" spoken by the caller 400. The phone server 600 notifies the server 800 of the keyword.

State 62. The premium keyword occurrence is logged in the database 900 for the call. Optionally, a configurable number of seconds before and after the keyword is recorded by the phone server 600 and stored in the database for advertiser 300 review and auditing purposes. Optionally, the entire phone conversation is recorded and the recording is post-call analyzed for premium keywords.

Figure 38:
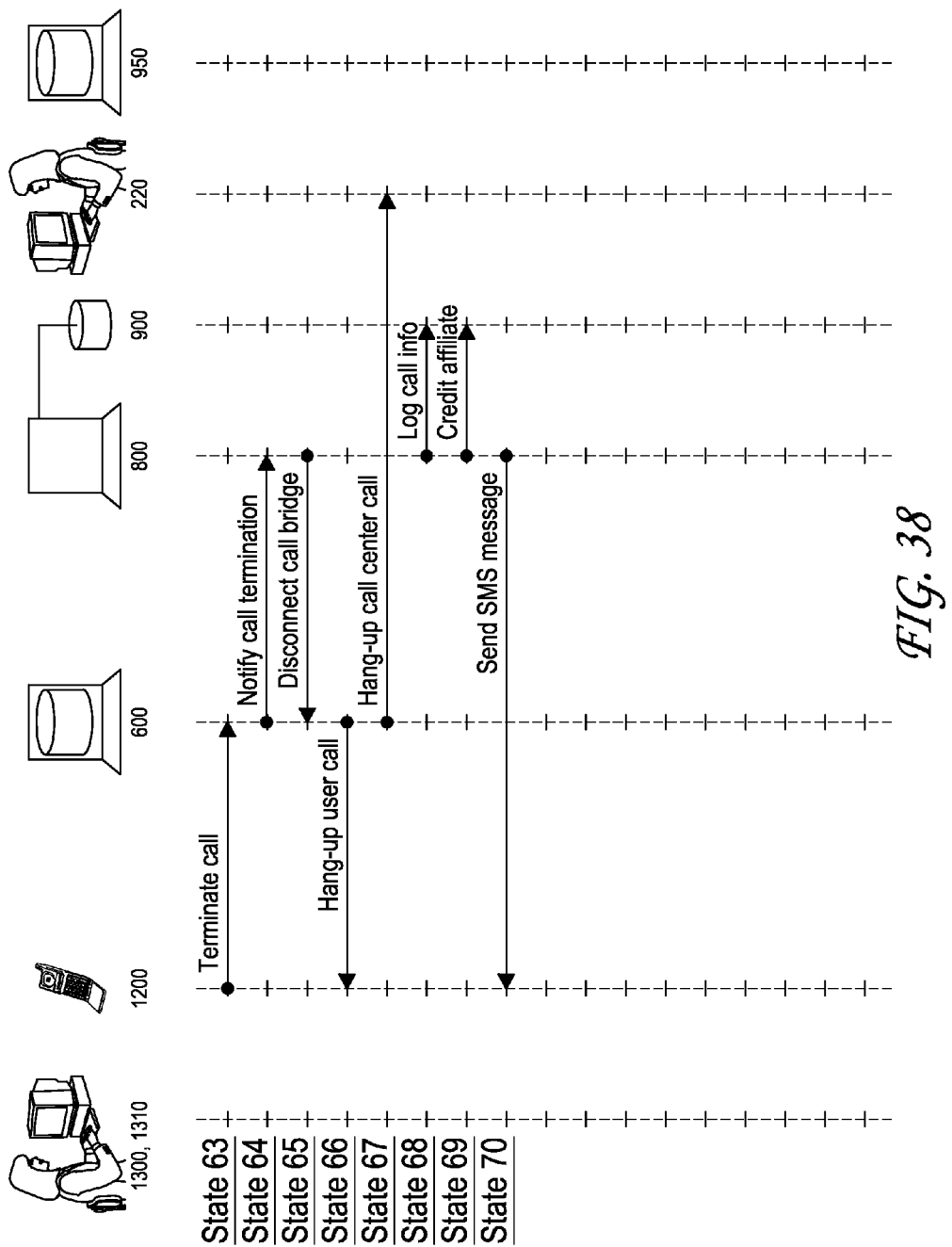

State 63 of FIG. 38. In this example, the phone server 600 detects the termination of the call by the caller (e.g., caller hung up).

State 64. The phone server 600 notifies the server 800 of the call termination by the caller.

State 65. In this example, the server 800 requests the phone server 600 terminate the call bridge between the customer/caller 400 and the call center 220.

State 66. In this example, the phone server 600 terminates the inbound call from the customer/caller 400.

State 67. In this example, the phone server 600 terminates the outbound call to the call center 230.

State 68. The server 800 writes a call detail record to the database, the call detail record including information about the call (e.g., length of the call, calling party ID, etc).

State 69. The call bridging platform calculates the value of the call to the affiliate 200 and credits the affiliate 200 for the call by updating the database 900. In this example, the call was determined to be of high quality because the keyword "friend" was detected in the voice conversation with the call center agent. (In this example, the call was also high quality because the incoming call from the caller/customer originated from a cell phone.) The advertiser configured high quality calls to be of $5 in value. Therefore, the affiliate was credited in the amount of $5 for the call.

State 70. The campaign is configured to send SMS messages if the inbound call is from a cell phone. The server 800 composes a text message, "Thank you for your interest in baby fans, if you have any further questions visit our web site www.acmebabyfans.com" and sends an SMS message to the customer/caller's 400 mobile phone 1200 from the notification module. Optionally, the SMS message is sent at any point in the call including when the caller/customer accepted the offer. Optionally, the text message includes a telephone number.

The methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware. Further, components and tasks described herein can be implemented as web services. Data described herein as being received or generated by a computer system may optionally be stored in and accessed from computer readable memory.

The computers described herein (including servers, terminals, phones, interactive televisions, etc.) can include one or more central processing units (CPUs) that execute program code and process data, memory, including volatile memory, such as random access memory (RAM) optionally for temporarily storing data and data structures during program execution, and/or non-volatile memory, such as a hard disc drive, optical drive, or FLASH drive, optionally for storing programs and data, including databases, which may be referred to as a "system database," and a wired and/or wireless network interface for accessing an intranet and/or Internet. The computers can include a display for displaying user interfaces, data, and the like, and one or more user input devices, such as a keyboard, mouse, pointing device, microphone and/or the like, used to navigate, provide commands, enter information, provide search queries, and/or the like.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

The invention claimed is:

1. A method of processing calls, comprising:
    assigning a first phone address to an advertising campaign in response to a request received over a data network wherein the assigned first phone address is included in advertisements associated with the advertising campaign, wherein an affiliate is associated with the advertising campaign;
    storing in computer memory a call quality rating criteria;
    after the first phone address is published in a first advertisement associated with the advertising campaign, receiving at a call bridging system coupled to at least one network, an inbound call from a caller, to whom the first advertisement has been presented, directed to the first phone address wherein the inbound call is associated with call signaling information;
    generating an outbound call from the call bridging system to an advertiser associated with the advertising campaign;
    bridging the inbound and the outbound call;

comparing, by a computer system, one or more parameters of the inbound call and/or the bridged call to the call quality rating criteria; and crediting, via the computer system, the affiliate for the bridged call based at least in part on the comparison of the one or more parameters with the call quality rating criteria.

2. The method as defined in claim 1, the method further comprising:

selecting a second phone address from a set of phone addresses to direct the outbound call to based at least in part on the comparison of the one or more parameters with the call quality rating criteria.

3. The method as defined in claim 1, wherein the affiliate credit amount is determined at least in part by the comparison of the one or more parameters with the call quality rating criteria.

4. The method as defined in claim 1, wherein the first phone address is a toll-free telephone number.

5. The method as defined in claim 1, wherein the call quality rating criteria is established by the advertiser or an agent of the advertiser.

6. The method as defined in claim 1, wherein the call quality rating criteria is established by the advertiser.

7. The method as defined in claim 1, wherein a first of the one or more parameters for evaluating call quality is a gender associated with the caller.

8. The method as defined in claim 1, wherein a first of the one or more parameters for evaluating call quality is an income associated with the caller.

9. The method as defined in claim 1, wherein a first of the one or more parameters for evaluating call quality is a length of the call.

10. The method as defined in claim 1, wherein a first of the one or more parameters for evaluating call quality is whether the inbound call originates from a landline home, landline business, or mobile telecommunications device.

11. The method as defined in claim 1, wherein the at least one network includes a telephone network.

12. The method as defined in claim 1, the method further comprising:

recording at least a portion of audio of the inbound call; and
making at least a portion of the audio recording available to the affiliate or the advertiser.

13. The method as defined in claim 1, the method further comprising:

identifying, by the computer system, words and/or phrases in a voice communication from the caller associated with the inbound call;
comparing, by the computer system, words and/or phrases from the voice communication to a set of keywords and/or phrases; and
if a match is detected by the comparison, storing in computer memory an indication regarding the detection of a matched keyword and/or phrase.

14. The method as defined in claim 13, wherein a first of the one or more parameters compared with the call quality rating criteria includes a matched keyword and/or phrase in the voice communication of the caller.

15. The method as defined in claim 1, wherein a first of the one or more parameters compared with the call quality rating criteria is derived at least in part from the call signaling information associated with the inbound call from the caller.

16. The method as defined in claim 1, the method further comprising:

comparing a phone address of the caller accessed from the call signaling information associated with the inbound call from the caller with at least one calling party's phone address associated with at least one previous call received within a configurable time period stored in computer readable memory; and
if there is a match, crediting the affiliate an amount wherein the amount is a default amount or a variable amount specified by the advertiser.

17. The method as defined in claim 16, wherein the amount credited to the affiliate on a match is no credit amount.

18. The method as defined in claim 1 wherein the affiliate credit amount is a fixed amount and a dynamic call amount based at least in part on the comparison of the one or more parameters with the call quality rating criteria.

19. The method as defined in claim 1, wherein the affiliate assigns the first phone address.

20. The method as defined in claim 1, wherein a phone address associated with the outbound call is a number assigned by the advertiser accessed from computer readable memory.

21. A method of processing call information, comprising:

storing in non-transitory computer readable memory call quality rating criteria;
receiving at a call bridging system coupled to at least one network, a request over a data network from a user to receive a call;
generating at the call bridging system a first outbound call to the user;
generating a second outbound call from the call bridging system;
bridging the first and second outbound calls;
comparing, by a computer system, one or more parameters of the user and/or the first outbound call to the call quality rating criteria; and
crediting, via the computer system, an affiliate for the bridged call based at least in part on the comparison of the one or more parameters with the call quality rating criteria.

22. The method as defined in claim 21, wherein the request from the user to receive a call is provided via an activation of a web page control.

23. The method as defined in claim 21, the method further comprising:

selecting a phone address to originate the second outbound call based at least in part on the comparison of the one or more parameters with the call quality rating criteria.

24. The method as defined in claim 21, wherein the affiliate credit amount is determined at least in part by the comparison of the one or more parameters with the call quality rating criteria.

25. The method as defined in claim 21, wherein one of the one or more parameters compared with the call quality rating criteria is a gender of the user.

26. The method as defined in claim 21, wherein one of the one or more parameters compared with the call quality rating criteria is the length of the bridged first outbound and second outbound call.

27. The method as defined in claim 21, wherein one of the one or more parameters compared with the call quality rating criteria is related to income of the user.

28. The method as defined in claim 21, wherein one of the one or more parameters compared with the call quality rating criteria is whether the first outbound call to the user is to a landline home, landline business, or mobile phone.

29. The method as defined in claim 21, wherein the at least one network includes a telephone network.

30. The method as defined in claim 21, the method further comprising:

recording at least a portion of audio of the bridged first outbound and second outbound call;

making at least a portion of the audio recording available to the affiliate or an advertiser.

31. The method as defined in claim 21, the method further comprising:

identifying words and/or phrases in a user's voice communication associated with the first outbound call;

comparing words and/or phrases from the user's voice communication to a set of keywords and/or phrases; and if there is a match, storing in computer memory an indication regarding detection of a matched keyword and/or phrase.

32. The method as defined in claim 21, the method further comprising:

storing at least a portion of a phone address of the user in a computer readable medium.

33. The method as defined in claim 21, the method further comprising:

comparing a phone address of the user and user phone addresses of previous calls in a configurable time period stored in computer memory;

if there is a match, crediting the affiliate an amount wherein the amount is a default amount or a variable amount specified by an advertiser.

34. The method as defined in claim 33, wherein the amount credited to the affiliate on a match is no credit amount.

35. The method as defined in claim 21, wherein the second outbound call is placed to a phone address assigned by an advertiser.

36. A method of phone communications, comprising:

creating an information object in a server system;

storing the information object in non-transitory computer readable memory;

assigning a phone address to the information object;

making available the information object from a server of an affiliate to a server of an advertiser over a data network in response to a user gesture with respect to a web page;

enabling the display of the phone address to the user on web page of the advertiser;

receiving at a call bridging system coupled to at least one network, a call from the user directed to the phone address, wherein the call is associated with call signaling information;

generating first outbound call from the call bridging system to a first number specified by the advertiser;

bridging the inbound and the first outbound call; and crediting the affiliate with respect to the bridged call.

37. The method as defined in claim 36, wherein the information object is an information object of the affiliate.

38. The method as defined in claim 36, wherein the information object is web-based.

39. The method as defined in claim 36, the method further comprising:

receiving at the call bridging system a request from the user to receive a call;

generating at the call bridging system a first outbound call to the user;

generating a second outbound call from the call bridging system to a second number specified by the advertiser;

bridging the first outbound call to the user and the second outbound call; and crediting the affiliate for the bridged call.

40. A method of processing telecommunications comprising:

assigning a phone address for use with an advertising campaign wherein the assigned phone address is included in advertisements associated with the advertising campaign, wherein an affiliate is associated with the advertising campaign;

after the phone address is published in a first advertisement associated with the advertising campaign, receiving at a call bridging system coupled to at least one network, an inbound call from a caller, to whom the first advertisement has been presented, directed to the phone address;

generating an outbound call from the call bridging system to a number specified in the advertising campaign;

bridging the inbound and the outbound call to form a bridged call;

monitoring, by a computer system, one or more call parameters;

comparing, by the computer system, one or more call parameters against a set of threshold values that includes at least one threshold value;

rejecting, by the computer system, at least one subsequent call to the phone address based on the comparison exceeding a first threshold value; and crediting the affiliate for non-rejected bridged calls and inhibiting crediting the affiliate for rejected calls.

41. The method as defined in claim 40, wherein the one or more call parameters includes a phone address of the caller.

42. The method as defined in claim 40, wherein the one or more call parameters includes a length of the bridged call.

43. The method as defined in claim 40, further comprising providing to the caller a ring no answer signal, a busy signal, or a recorded announcement if the outbound call is rejected.

44. A method of tracking and crediting call related information, comprising:

assigning a phone address for use with an advertising campaign wherein the assigned phone address is included in advertisements associated with the advertising campaign, wherein an affiliate is associated with the advertising campaign;

storing in a non-transitory tangible computer readable medium a call quality rating criteria;

after the phone address is published in a first advertisement associated with the advertising campaign, receiving at a call bridging system coupled to at least one network, an inbound call from a caller, to whom the first advertisement has been presented, directed to the phone address;

based at least in part on the phone address called, playing a selected voice prompt to the caller, wherein the voice prompt is selected by a computer system;

generating an outbound call from the call bridging system based at least in part on a response from the caller to one or more voice prompts and a phone address specified by an advertiser;

bridging the inbound and the outbound call to form a bridged call;

comparing, by the computer system, one or more parameters of the inbound call and/or the bridged call to the call quality rating criteria; and crediting the affiliate for the bridged call based at least in part of the comparison.

45. The method as defined in claim 44, wherein the response from the caller is provided via a dual-tone multi-frequency tone.

46. The method as defined in claim 44, wherein the response from the caller is provided via a spoken command.

47. The method as defined in claim 44, wherein the one or more parameters includes the response from the caller.

48. The method as defined in claim 46, the method further comprising:

the call bridging system using speech recognition to determine the spoken command.

49. A non-transitory tangible computer-readable medium having computer-executable instructions stored thereon that, if executed by a computing device, cause the computing device to perform a method comprising:
assigning a first phone address to an advertising campaign in response to a request received over a data network wherein the assigned phone address is included in advertisements associated with the advertising campaign, wherein an affiliate is associated with the advertising campaign;
storing in computer memory a call quality rating criteria;
after the first phone address is published in a first advertisement associated with the advertising campaign, receiving an inbound call from a caller, to whom the first advertisement has been presented, directed to the first phone address wherein the inbound call is associated with call signaling information;
initiating an outbound call to an advertiser associated with the advertising campaign;
causing the inbound and the outbound call to be connected;
comparing one or more parameters of the inbound call and/or the connected call to the call quality rating criteria; and
crediting the affiliate for the connected call based at least in part on the comparison of the one or more parameters with the call quality rating criteria.

50. The tangible computer-readable medium as defined in claim 49, the method further comprising:
selecting a second phone address from a set of phone addresses to direct the outbound call to based at least in part on the comparison of the one or more parameters with the call quality rating criteria.

51. The tangible computer-readable medium as defined in claim 49, wherein the affiliate credit amount is determined at least in part by the comparison of the one or more parameters with the call quality rating criteria.

52. The tangible computer-readable medium as defined in claim 49, wherein the first phone address is a toll-free telephone number.

53. The tangible computer-readable medium as defined in claim 49, wherein the call quality rating criteria is established by the advertiser or an agent of the advertiser.

54. The tangible computer-readable medium as defined in claim 49, wherein the call quality rating criteria is established by the advertiser.

55. The tangible computer-readable medium as defined in claim 49, wherein a first of the one or more parameters is a gender associated with the caller.

56. The tangible computer-readable medium as defined in claim 49, wherein a first of the one or more parameters is an income associated with the caller.

57. The tangible computer-readable medium as defined in claim 49, wherein a first of the one or more parameters is a length of the call.

58. The tangible computer-readable medium as defined in claim 49, wherein a first of the one or more parameters is whether the inbound call originates from a landline home, landline business, or mobile telecommunications device.

59. The tangible computer-readable medium as defined in claim 49, wherein the at least one network includes a telephone network.

60. The tangible computer-readable medium as defined in claim 49, the method further comprising:
recording at least a portion of audio of the inbound call; and
making at least a portion of the audio recording available to the affiliate or the advertiser.

61. The tangible computer-readable medium as defined in claim 49, the method further comprising:
identifying words and/or phrases in a voice communication from the caller associated with the inbound call;
comparing words and/or phrases from the voice communication to a set of keywords and/or phrases; and
if a match is detected by the comparison, storing in computer memory an indication regarding the detection of a matched keyword and/or phrase.

62. The tangible computer-readable medium as defined in claim 61, wherein a first of the one or more parameters compared with the call quality rating criteria includes a matched keyword and/or phrase in the voice communication of the caller.

63. The tangible computer-readable medium as defined in claim 49, wherein a first of the one or more parameters compared with the call quality rating criteria is derived at least in part from the call signaling information associated with the inbound call from the caller.

64. The tangible computer-readable medium as defined in claim 49, the method further comprising:
comparing a phone address of the caller accessed from the call signaling information associated with the inbound call from the caller with at least one calling party's phone address associated with at least one previous call received within a configurable time period stored in computer readable memory; and
if there is a match, crediting the affiliate an amount wherein the amount is a default amount or a variable amount specified by the advertiser.

65. The tangible computer-readable medium as defined in claim 49 wherein the affiliate credit amount is a fixed amount and a dynamic call amount based at least in part on the comparison of the one or more parameters with the call quality rating criteria.

66. The method as defined in claim 1, wherein the computer system comprises the call bridging system.

67. The method as defined in claim 21, wherein the computer system comprises the call bridging system.

68. The method as defined in claim 40, wherein the computer system comprises the call bridging system.

69. The method as defined in claim 44, wherein the computer system comprises the call bridging system.

* * * * *